(12) United States Patent
Takami

(10) Patent No.: US 9,396,165 B2
(45) Date of Patent: Jul. 19, 2016

(54) INFORMATION DISPLAY SYSTEM, INFORMATION DISPLAY APPARATUS, INFORMATION DISPLAY METHOD, INFORMATION DISPLAY PROGRAM, INFORMATION PROVIDING APPARATUS, AND RECORDING MEDIUM

(75) Inventor: Shinya Takami, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 239 days.

(21) Appl. No.: 13/520,604

(22) PCT Filed: Jun. 22, 2011

(86) PCT No.: PCT/JP2011/064237
§ 371 (c)(1),
(2), (4) Date: Jul. 5, 2012

(87) PCT Pub. No.: WO2012/002209
PCT Pub. Date: Jan. 5, 2012

(65) Prior Publication Data
US 2012/0274552 A1    Nov. 1, 2012

(30) Foreign Application Priority Data
Jun. 28, 2010   (JP) .................... 2010-146861

(51) Int. Cl.
*G09G 5/00*    (2006.01)
*G06F 17/21*    (2006.01)
(Continued)

(52) U.S. Cl.
CPC .............. *G06F 17/211* (2013.01); *G06F 3/013* (2013.01); *G06F 3/0485* (2013.01); *G06F 3/0487* (2013.01); *G06F 17/30905* (2013.01); *G06F 2203/04806* (2013.01)

(58) Field of Classification Search
CPC ............ G06F 17/211; G06F 17/30905; G06F 2203/04806; G06F 3/013; G06F 3/0485; G06F 3/0487

USPC ................. 345/660, 619, 419, 633, 173, 156; 715/273; 707/706, 732
See application file for complete search history.

(56) References Cited

U.S. PATENT DOCUMENTS 6,330,576 B1    12/2001  Mochizuki et al.
2002/0116420 A1*  8/2002  Allam et al. ................. 707/526
(Continued)

FOREIGN PATENT DOCUMENTS

CN    1533541 A    9/2004
CN    1776677 A    5/2006
(Continued)

OTHER PUBLICATIONS

International Search Report for PCT/JP2011/064237 dated Sep. 27, 2011.

*Primary Examiner* — Quan-Zhen Wang
*Assistant Examiner* — Tony Davis
(74) *Attorney, Agent, or Firm* — Sughrue Mion, PLLC

(57) ABSTRACT

The present invention includes: receiving, from a terminal, display position information for specifying a display area 31 of content information displayed on a display unit among content information to be displayed on the display unit 23 of the terminal 20 (S5); receiving, from the terminal, operation position information related to an operation position operated on a screen of a display area by a user (S5); specifying a gaze area 34 of a display portion gazed by the user, based on operation position information (S6); extracting a feature element from the gaze area (S7); specifying an undisplay area of content information which is not yet displayed on the display unit, from display position information (S8); generating condensed information of content information included in the non-display area, based on the feature element (S9); and transmitting condensed information to the terminal (S10).

5 Claims, 14 Drawing Sheets

(51) Int. Cl.
*G06F 3/0487* (2013.01)
*G06F 3/01* (2006.01)
*G06F 3/0485* (2013.01)
*G06F 17/30* (2006.01)

(56) References Cited

U.S. PATENT DOCUMENTS

| | | | |
|---|---|---|---|
| 2004/0172410 A1* | 9/2004 | Shimojima et al. | 707/104.1 |
| 2005/0047629 A1* | 3/2005 | Farrell | G06F 3/013 382/117 |
| 2006/0069618 A1* | 3/2006 | Milener et al. | 705/14 |
| 2006/0104276 A1 | 5/2006 | Naick et al. | |
| 2006/0156222 A1 | 7/2006 | Chi et al. | |
| 2008/0092040 A1* | 4/2008 | Nakamura | 715/273 |
| 2008/0320396 A1* | 12/2008 | Mizrachi et al. | 715/744 |
| 2009/0112813 A1* | 4/2009 | Jung | G06F 17/30964 |
| 2009/0112817 A1* | 4/2009 | Jung | G06F 17/30967 |
| 2009/0112849 A1* | 4/2009 | Jung | G06F 3/011 |
| 2010/0241624 A1* | 9/2010 | Ramsey | G06F 17/30696 707/732 |
| 2010/0250553 A1* | 9/2010 | Higuchi et al. | 707/748 |
| 2012/0240079 A1* | 9/2012 | Takami | G06F 3/0485 715/784 |
| 2012/0278742 A1* | 11/2012 | Takami | G06Q 30/02 715/760 |
| 2013/0073951 A1* | 3/2013 | Takami | G06F 3/0481 715/243 |
| 2014/0089787 A1* | 3/2014 | Takami | G06F 3/14 715/234 |
| 2014/0189558 A1* | 7/2014 | Takami | G06F 3/0481 715/767 |

FOREIGN PATENT DOCUMENTS

| | | |
|---|---|---|
| JP | 11-250077 A | 9/1999 |
| JP | 2002-140321 A | 5/2002 |
| JP | 2004-326687 A | 11/2004 |
| JP | 2006-190298 A | 7/2006 |
| JP | 2008-146177 A | 6/2008 |

* cited by examiner

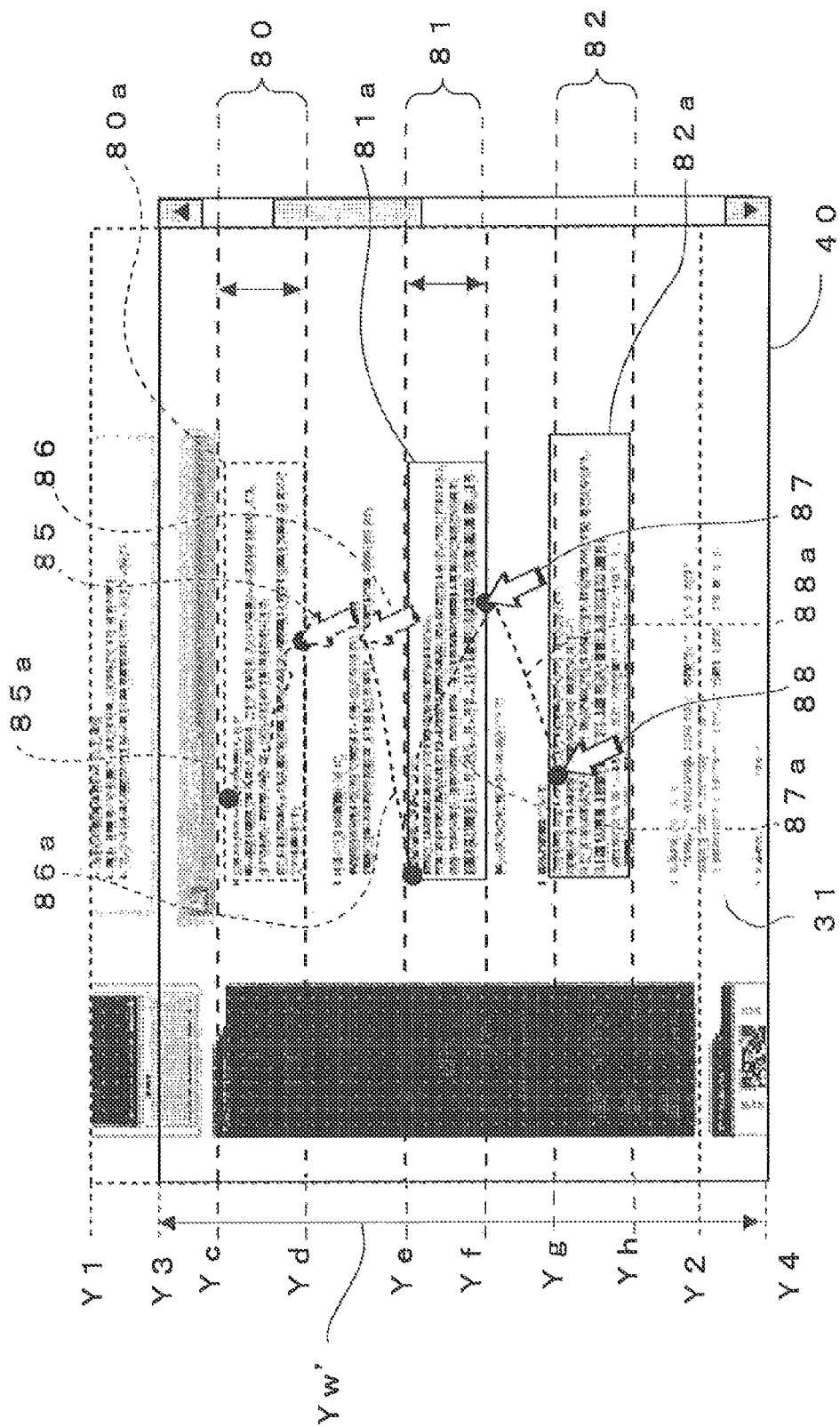

INFORMATION DISPLAY SYSTEM, INFORMATION DISPLAY APPARATUS, INFORMATION DISPLAY METHOD, INFORMATION DISPLAY PROGRAM, INFORMATION PROVIDING APPARATUS, AND RECORDING MEDIUM

CROSS REFERENCE TO RELATED APPLICATIONS

This application is a National Stage of International Application No. PCT/JP2011/064237 filed Jun. 22, 2011, claiming priority based on Japanese Patent Application No. 2010-146861 filed Jun. 28, 2010, the contents of all of which are incorporated herein by reference in their entirety.

TECHNICAL FIELD

The present invention relates to a technical field of an information display system, an information display apparatus, an information display method, an information display program, an information providing apparatus and a recording medium which provide information of, for example, condensed Web pages.

BACKGROUND ART

In case of a web page having a size which cannot be displayed once on a display screen of a terminal, it is necessary to look at the web page by scrolling the web page using an operation unit such as a keyboard or a mouse. In this case, a technique such as automatic scroll is being developed to improve users' convenience. For example, Patent Document 1 discloses a cursor pointer processing program of automatically moving a cursor pointer on data in an updated screen by way of automatic scrolling, in conjunction with automatic scrolling of data.

PRIOR ART DOCUMENT

Patent Document

Patent Document 1 Japanese Patent Application Laid-Open No. 2004-326687

SUMMARY OF THE INVENTION

Problems to be Solved by the Invention

However, with the above technique, when the same content as a portion which is looked at on a web page or related content needs to be searched for, it is necessary to scroll the web page one after another to search for content, and sequentially check content.

The present invention is made in light of this problem, and an example of an object of the present invention is to provide an information display system, an information display apparatus, an information display method, an information display program, an information providing apparatus and a recording medium which, when there is content information having an amount which does not settle in the screen, can easily check a portion of content related to a displayed portion, at a portion which is not displayed in the screen.

Means for Solving the Problems

To solve the above problem, an aspect of an exemplary embodiment includes: a display means that can display content information;

a display position information acquiring means that acquires display position information for specifying a display portion of the content information displayed on the display means among content information to be displayed on the display means;

an operation position information acquiring means that acquires operation position information related to an operation position operated on a screen by a user in the display portion;

a gaze portion specifying means that specifies a gaze portion gazed by the user in the display portion, based on the operation position information;

a feature element extracting means that extracts a feature element from the gaze portion;

an undisplay portion specifying means that specifies an undisplay portion of the content information which is not yet displayed on the display means, from the display position information;

a condensed information generating means that generates condensed information obtained by condensing content information included in the undisplay portion, based on the feature element; and a condensed information display means that causes the condensed information to be displayed on the display means.

Another aspect of an exemplary embodiment is characterized in that in the information display system, the undisplay portion specifying means specifies the undisplay portion, based on the display position information and initial display position information indicating an initial display portion of the content information in the display means.

Another aspect of an exemplary embodiment is characterized in that in the information display system, the information display system further includes: an input means that receives an input; and an input decision information acquiring means that acquires input decision information when no input is received for a given period and an input is received again, based on input information of the input means, and the condensed information display means causes the input decision information to be displayed on the display means when acquiring the input decision information.

Another aspect of an exemplary embodiment is characterized in that in the information display system, the information display system further includes a deciding means that decides whether or not the display portion or the gaze portion is changed, based on the operation position information, and, when the display portion or the gaze portion is changed, the condensed information generating means generates the condensed information, and the condensed information display means causes the condensed information to be displayed.

Another aspect of an exemplary embodiment in the information display method of displaying information includes: a display position information acquiring step of acquiring display position information for specifying a display portion of the content information displayed on the display means among content information to be displayed on the display means;

an operation position information acquiring step of acquiring operation position information related to an operation position operated on a screen by a user in the display portion;

a gaze portion specifying step of specifying a gaze portion gazed by the user in the display portion, based on the operation position information;

a feature element extracting step of extracting a feature element from the gaze portion;

an undisplay portion specifying step of specifying an undisplay portion of the content information which is not yet displayed on the display means, from the display position information;
a condensed information generating step of generating condensed information of content information included in the undisplay portion, based on the feature element; and a condensed information Chi splaying step of causing the display means to display the condensed information.

Another aspect of an exemplary embodiment causes a computer to execute: a display position information acquiring step of acquiring display position information for specifying a display portion of the content information displayed on a display means among content information to be displayed on the display means;
an operation position information acquiring step of acquiring operation position information related to an operation position operated on a screen by a user in the display portion;
a gaze portion specifying step of specifying a gaze portion gazed by the user in the display portion, based on the operation position information;
an undisplay portion specifying step of specifying an undisplay portion of the content information which is not yet displayed on the display means, from the display position information; and a condensed information displaying step of causing the display means to display condensed information obtained by condensing content information included in the undisplay portion based on a feature element extracted from the gaze portion.

Another aspect of an exemplary embodiment includes a computer-readable recording medium recording an information display program causing a computer to function as: a display position information acquiring step of acquiring display position information for specifying a display portion of the content information displayed on a display means among content information to be displayed on the display means; an operation position information acquiring step of acquiring operation position information related to an operation position operated on a screen by a user in the display portion; a gaze portion specifying step of specifying a gaze portion gazed by the user in the display portion, based on the operation position information; an undisplay portion specifying step of specifying an undisplay portion of the content information which is not yet displayed on the display means, from the display position information; and a condensed information displaying step of causing the display means display condensed information obtained by condensing content information included in the undisplay portion based on a feature element extracted from the gaze portion.

Another aspect of an exemplary embodiment includes: a display position information acquiring means that acquires, from a terminal, display position information for specifying a display portion of the content information displayed on a display unit of the terminal among content information to be displayed on the display unit; an operation position information acquiring means that acquires, from the terminal, operation position information related to an operation position operated on a screen by a user in the display portion; a gaze portion specifying means that specifies a gaze portion gazed by the user in the display portion, based on the operation position information; a feature element extracting means that extracts a feature element from the gaze portion; an undisplay portion specifying means that specifies an undisplay portion of the content information which is not yet displayed on the display unit, from the display position information; a condensed information, generating means that generates condensed information obtained by condensing content information included in the undisplay portion, based on the feature element; and a condensed information transmitting means that transmits the condensed information to the terminal.

Another aspect of an exemplary embodiment includes: a display position information acquiring means that acquires display position information for specifying a display portion of the content information displayed on a display unit of a terminal among content information to be displayed on the display unit; an operation position information acquiring means that acquires operation position information related to an operation position operated on a screen by a user in the display portion, from an operation unit; a care portion specifying means that specifies a gaze portion gazed by the user in the display portion, based on the operation position information; a feature element extracting means that extracts a feature element from the gaze portion; an undisplay portion specifying means that specifies an undisplay portion of the content information which is not yet displayed on the display unit, from the display position information; a condensed information generating means that generates condensed information obtained by condensing content information included in the undisplay portion, based on the feature element; and a condensed information display means that causes the condensed information to be displayed on the display unit Effect of the Invention According to the present invention, by acquiring display position information for specifying a display portion of content information displayed on a display means, and operation position information related to an operation position operated on a screen by a user in a display portion, specifying a gaze portion gazed by the user in the display portion based on operation position information, extracting a feature element from the gaze portion and specifying an undisplay portion of content information which is not yet displayed on the display means, from display position information, and generating condensed information of content information included in the undisplay portion, based on the feature element, when there is content information having the amount which does not settle in the screen, it is possible to easily check content related to a portion gazed by the user, at a portion which is not displayed in the screen.

BRIEF DESCRIPTION OF THE DRAWINGS

FIG. 14 is a schematic view illustrating a modified example of a gaze area in content information in FIG. 6.

BEST MODES FOR CARRYING OUT THE INVENTION

Hereinafter, an embodiment of the present invention will be described with reference to the drawings.

[1. Overview of Configuration and Function of Information Display System]

First, an overview of a configuration and a function of an information display system according to one embodiment of the present invention will be described using FIG. 1.

Figure 1:
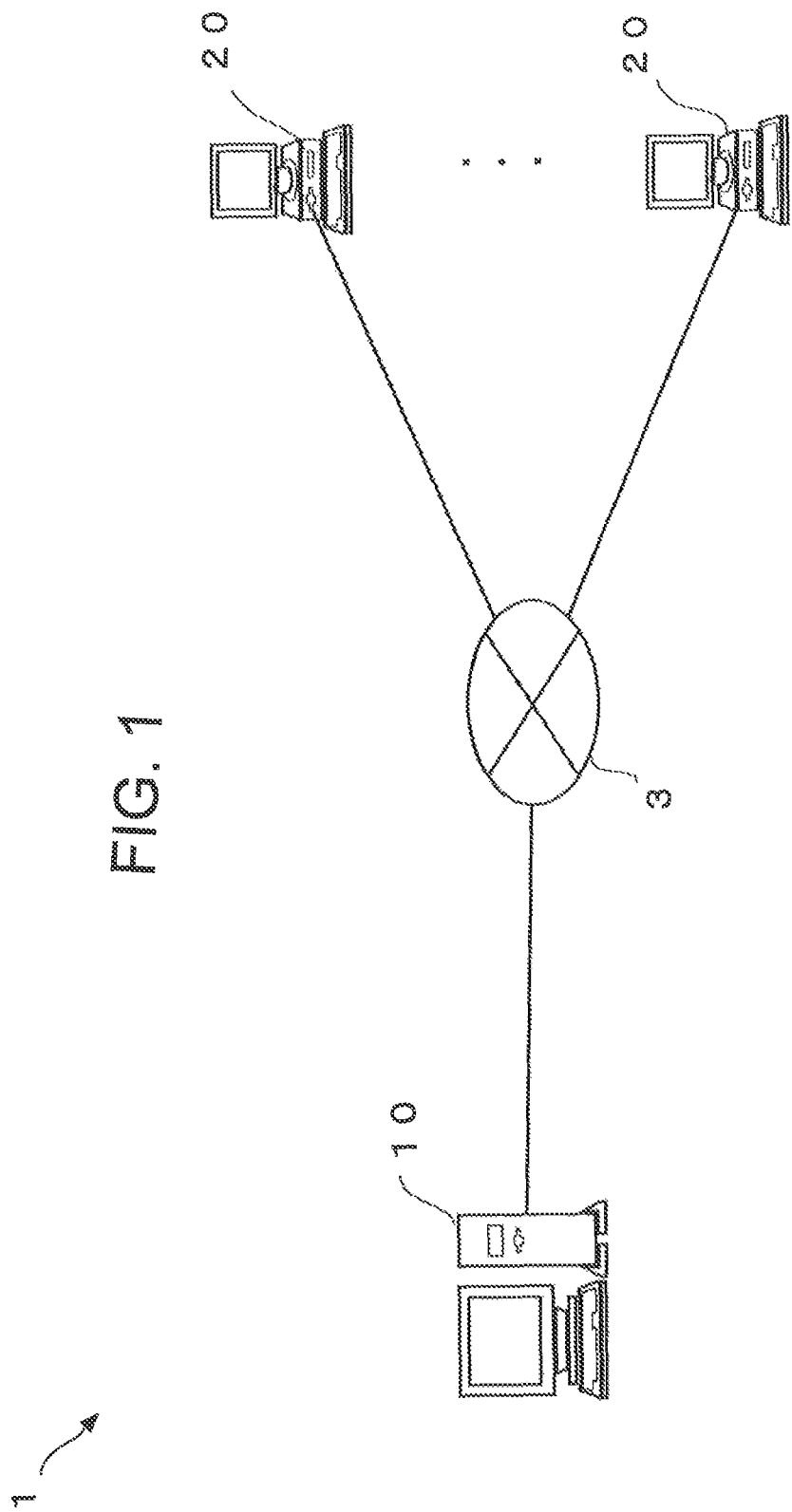
FIG. 1 is a schematic view illustrating a schematic configuration example of an information display system according to one embodiment of the present invention.

FIG. 1 is a schematic view illustrating a schematic configuration example of an information display system according to the present embodiment.

As illustrated in FIG. 1, the information display system 1 includes, for example, an information providing server (an example of an information providing apparatus) 10 which distributes content such as web pages and provides information (for example, abstract) of condensed web pages, and terminals 20 (an example of information display apparatuses) of users who browse web pages on Internet.

The information providing server 10 and the terminals 20 are connected through a network 3, and can transmit and receive data according to a communication protocol (for example, TCP/IP). In addition, the network 3 is constructed with, for example, Internet, a dedicated communication line (for example, CATV (Community Antenna Television) line), a mobile communication network (including, for example, base stations) and a gateway.

The information providing server 10 receives from the terminal 20 display position information for specifying a display portion of content information displayed on a display unit of the terminal 20, among content information transmitted to the terminal 20. Further, the information providing server 10 generates condensed information such as abstract information of content information which is not displayed on a display portion, based on display position information, and transmits condensed information to the terminal 20.

[2. Configuration and Function of Servers]

(2.1 Configuration and Function of Information Providing Server 10)

Next, a configuration and a function of the information providing server 10 will be described using FIG. 2.

Figure 2:
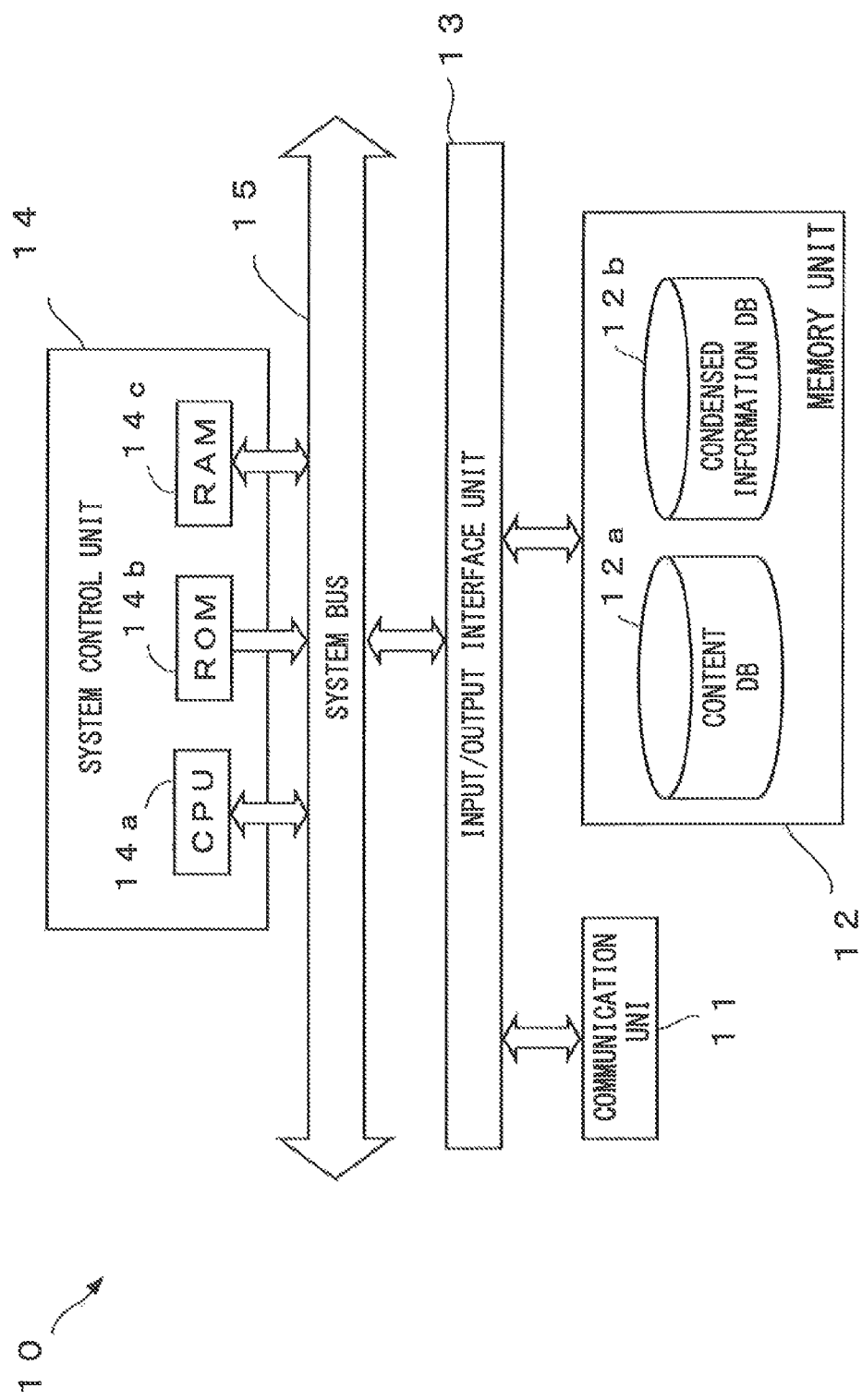
FIG. 2 is a block diagram illustrating an example of a schematic configuration of an information providing server in FIG. 1.

FIG. 2 is a block diagram illustrating an example of a schematic configuration of the information providing server 10.

As illustrated in FIG. 2, the information providing server 10 which functions as a computer includes a communication unit 11, a memory unit 12, an input/output interface unit 13 and a system control unit 14. Further, the system control unit 14 and the input/output interface unit 13 are connected through a system bus 15.

The communication unit 11 connects to the network 3 to control communication states with the terminals 20, and further connects to a local area network to transmit and receive data to and from a server on the local area network.

The memory unit 12 is formed with, for example, a hard disc drive, and stores, for example, various programs such as an operating system, a server program and a program downloaded and executed in, for example, the terminals 20, and data. In addition, the various programs may be acquired from, for example, another server apparatus through the network 3, or may be recorded in a recording medium and read through a drive apparatus.

Further, the memory unit 12 includes a content database (hereinafter "content DB") 12a and a condensed information database (hereinafter "condensed information DB") 12b and the like.

In the content DB 12a, files of web pages described by a markup language such as HTML (HyperText Markup Language) or XML (Extensible Markup Language) are stored. Further, in the content DB 12a, for example, text data, image data and movie data stored as information related to web pages.

In the condensed information DB 12b, condensed information such as abstract information which sums up information related to web pages are stored. Meanwhile, condensed information of information related to web pages includes, for example, a portion extracted from a web page and display obtained by condensing a web page in addition to abstract information.

In addition, a portion of a web page stored in a memory unit 12 is embedded with, for example, a script of transmitting operation information of a web page at the terminal 20 to the information providing server 10 and acquiring and displaying condensed information from the information providing server 10 as an example of an information display program.

Although this script is described by, for example, known JavaScript, this script is by no means limited to this and can be arbitrarily selected. Further, the details of these scripts are known techniques and will not be described in detail.

Next, the input/output interface unit 13 performs interface processing between the communication unit 11 and the memory unit 12, and the system control unit 14.

The system control unit 14 is formed with, for example, a CPU (Central Processing Unit) 14a, a ROM (Read Only Memory) 14b and a RAM (Random Access Memory) 14c. When the CPU 14a reads and executes various programs stored in the ROM 14b and the memory unit 12, the system control unit 14 performs processing of transmitting web pages based on requests from, for example, the terminals 20.

(2.2 Configuration and Function of Terminal 20)

Next, a configuration and a function of the terminal 20 will be described using FIG. 3.

Figure 3:
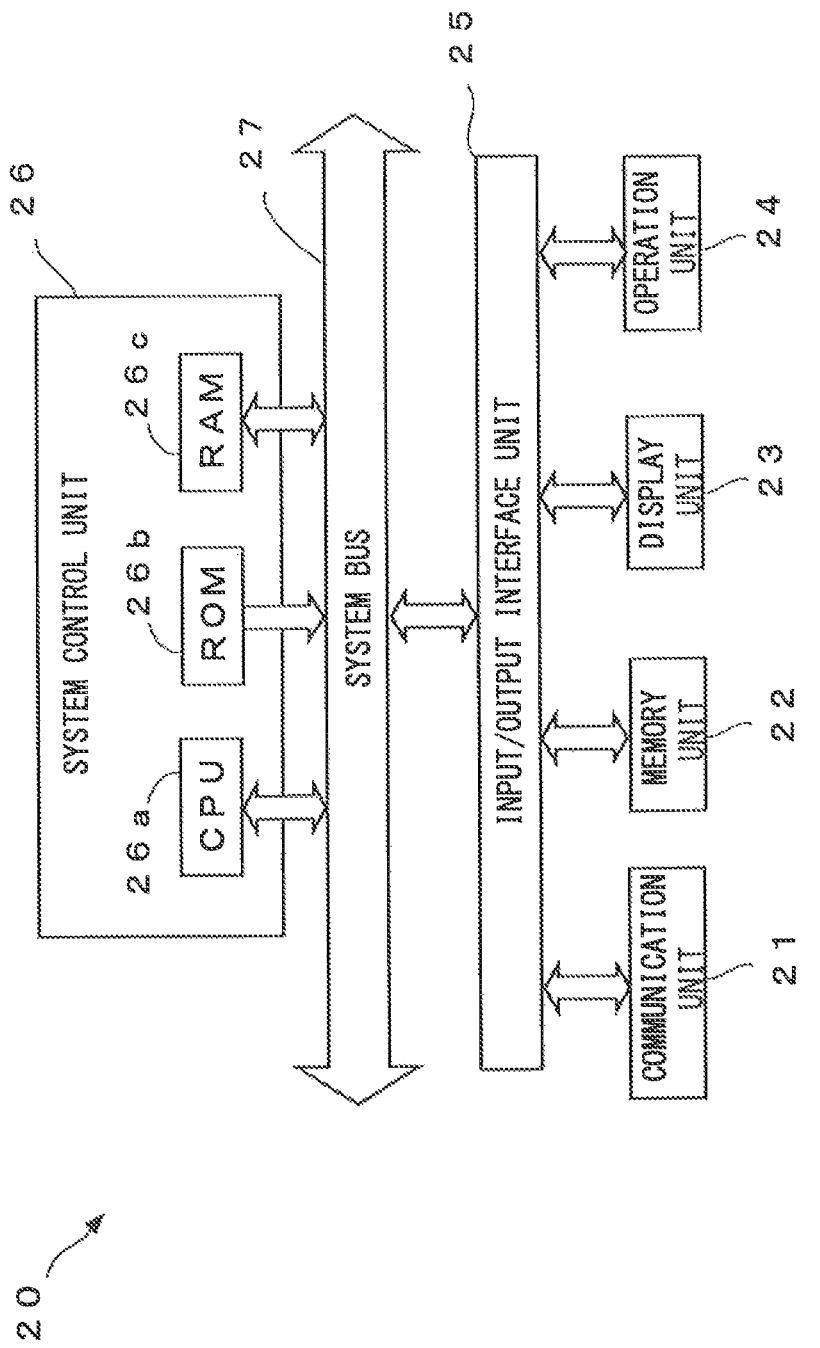
FIG. 3 is a block diagram illustrating an example of a schematic configuration of a terminal in FIG. 1.

FIG. 3 is a block diagram illustrating an example of a schematic configuration of the terminal 20.

As illustrated in FIG. 3, the terminal 20 which functions as a computer is a mobile terminal such as a personal computer, a mobile wireless telephone or a PDA, and includes a communication unit 21, a memory unit 22, a display unit 23, an operation unit 24, an input/output interface unit 25 and a system control unit 26. Further, the system control unit 26 and the input/output interface unit 25 are connected through a system bus 27.

The communication unit 21 controls communication with, for example, the information providing server 10 through the network 3. In addition, when the terminal 20 is a mobile wireless telephone, the communication unit 21 includes a wireless communication function for connecting to the mobile communication network of the network 3.

The memory unit 22 is formed with, for example, a hard disc drive, and stores, for example, an operating system and a web browser program. Further, the memory unit 22 stores a motion of scrolling by the operation unit 24 and a motion of a pointer moving on the display unit 23. In addition, the various programs may be acquired through, for example, the network 3, or may be recorded in a recording medium and read through a drive apparatus.

The display unit 23 (an example of a display means) is formed with, for example, a liquid crystal display element or an EL (Electra Luminescence) element. The display unit 23 displays a pointer which moves according to an operation of a mouse, and web pages acquired from the information providing server 10.

The operation unit 24 (an example of an input means) is formed with, for example, a keyboard and a mouse. In addition, when the display unit 23 is a display panel of a touch switch system such as a touch panel, the operation unit 24 acquires position information at a portion at which the screen of the display unit 23 is pressed. In addition, an example of the input means may be an image capturing means such as a camera or a sensor.

The input/output interface unit 25 functions as an interface between the communication unit 21 and the memory unit 22, and the system control unit 26.

The system control unit 26 includes, for example, a CPU 26a, a ROM 26b and a RAM 26c. When the CPU 26a reads and executes various programs stored in the ROM 26b, RAM 26c and the memory unit 22, the system control unit 26 executes a script of a web page to display condensed information such as abstract information on the display unit 23. Further, in, for example, the RAM 26c, a graphic region for displaying content information on the display unit 23 is formed.

[3. Operation of Information Display System 1]

Next, an operation of the information display system 1 according to one embodiment of the present invention will be described based on FIGS. 4 to 8.

Figure 4:
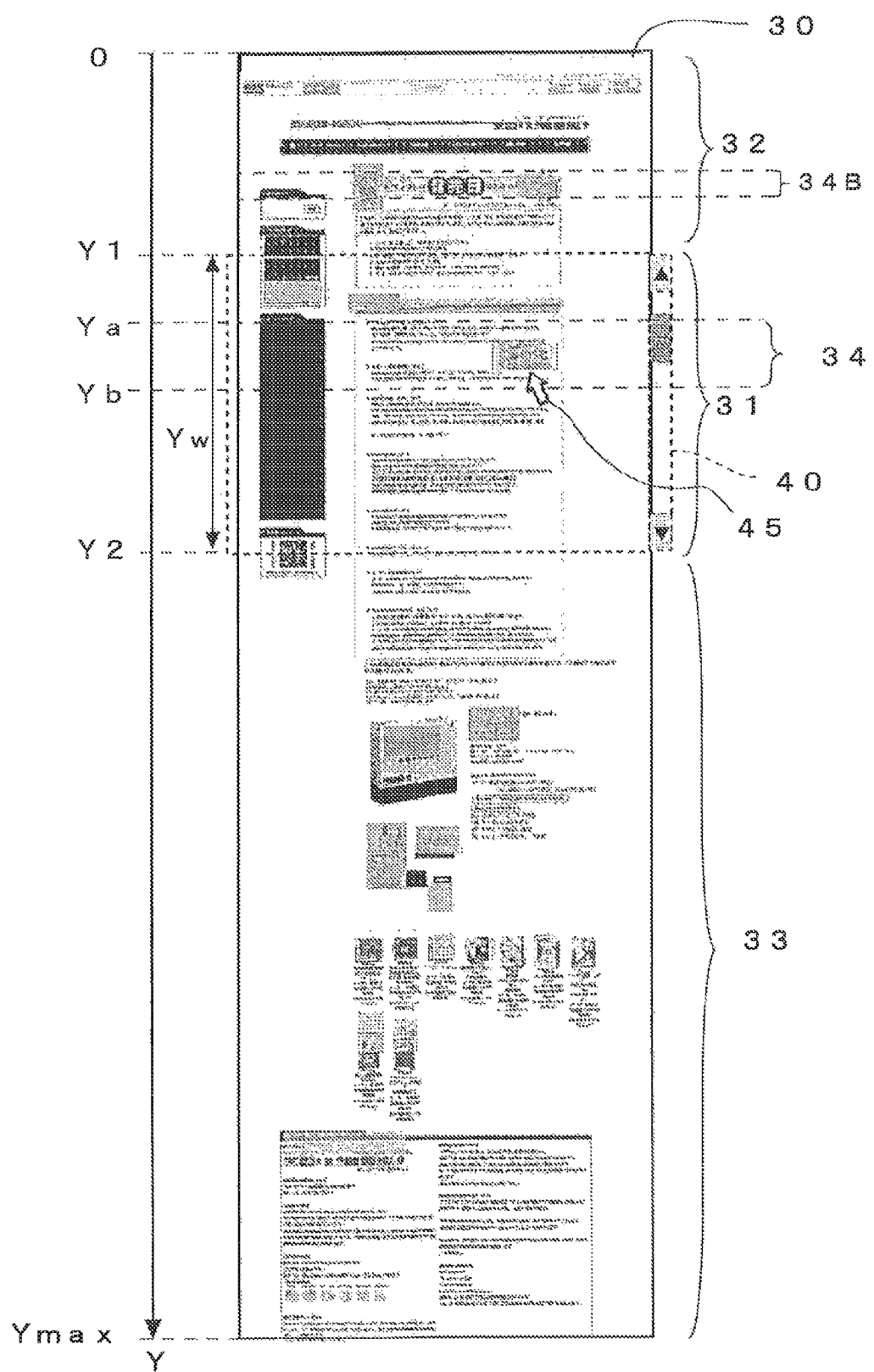
FIG. 4 is a schematic view illustrating an example of content information provided by the information providing server in FIG. 1.
Figure 5:
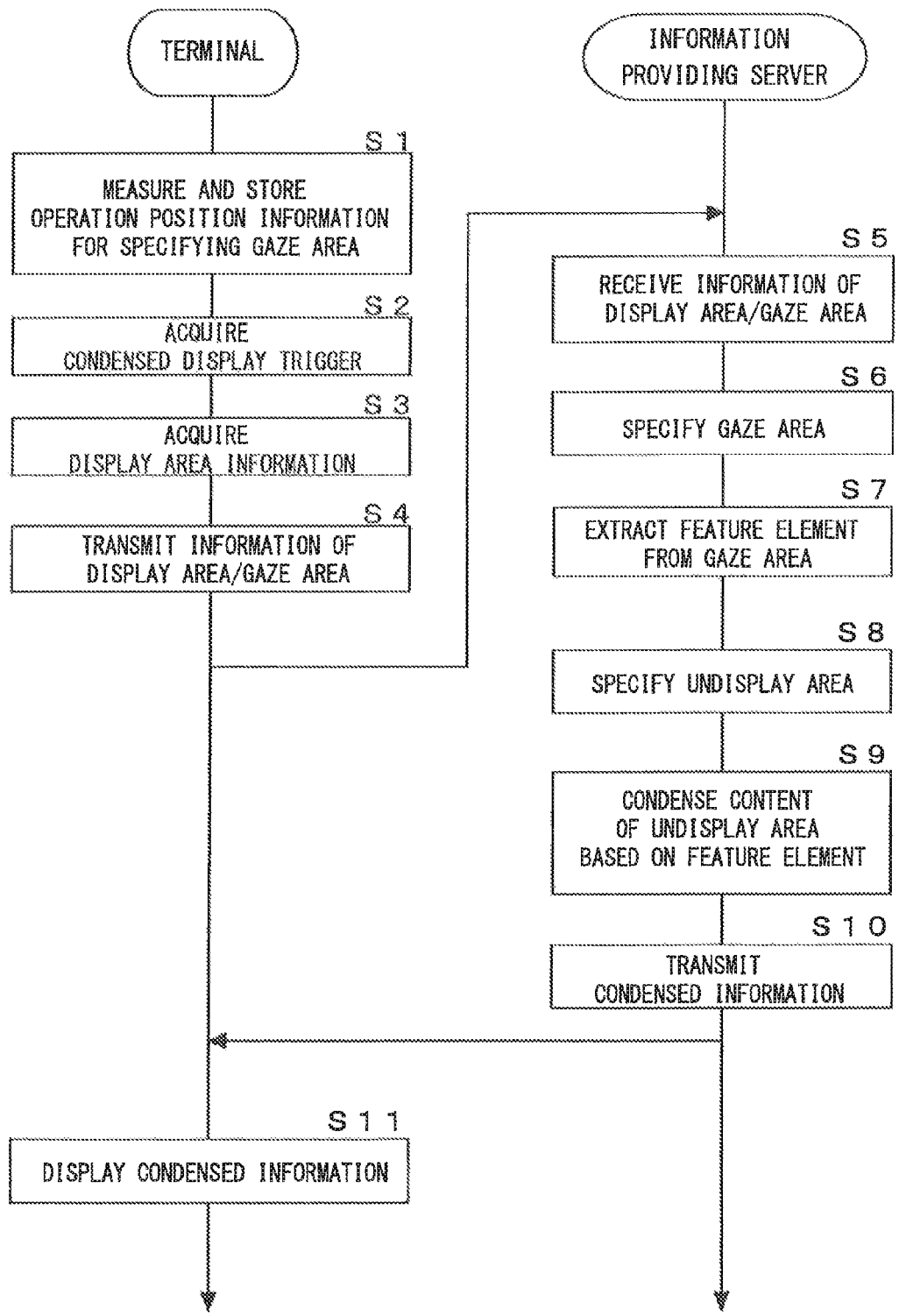
FIG. 5 is a sequence diagram illustrating an operation example of displaying condensed information in the information display system in FIG. 1.
Figure 6:
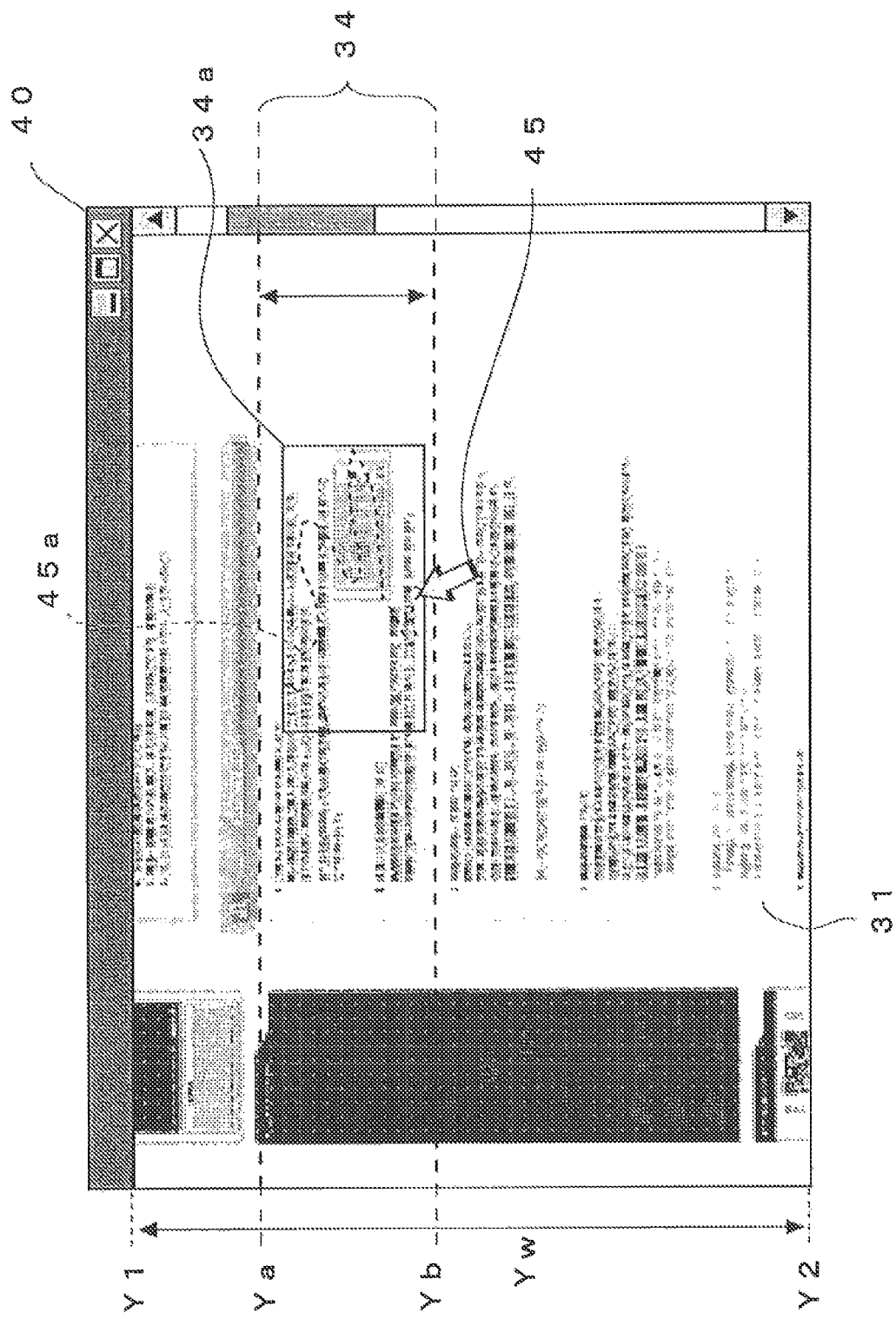
FIG. 6 is a schematic view illustrating an example of content information displayed on the terminal in FIG. 1.
Figure 7:
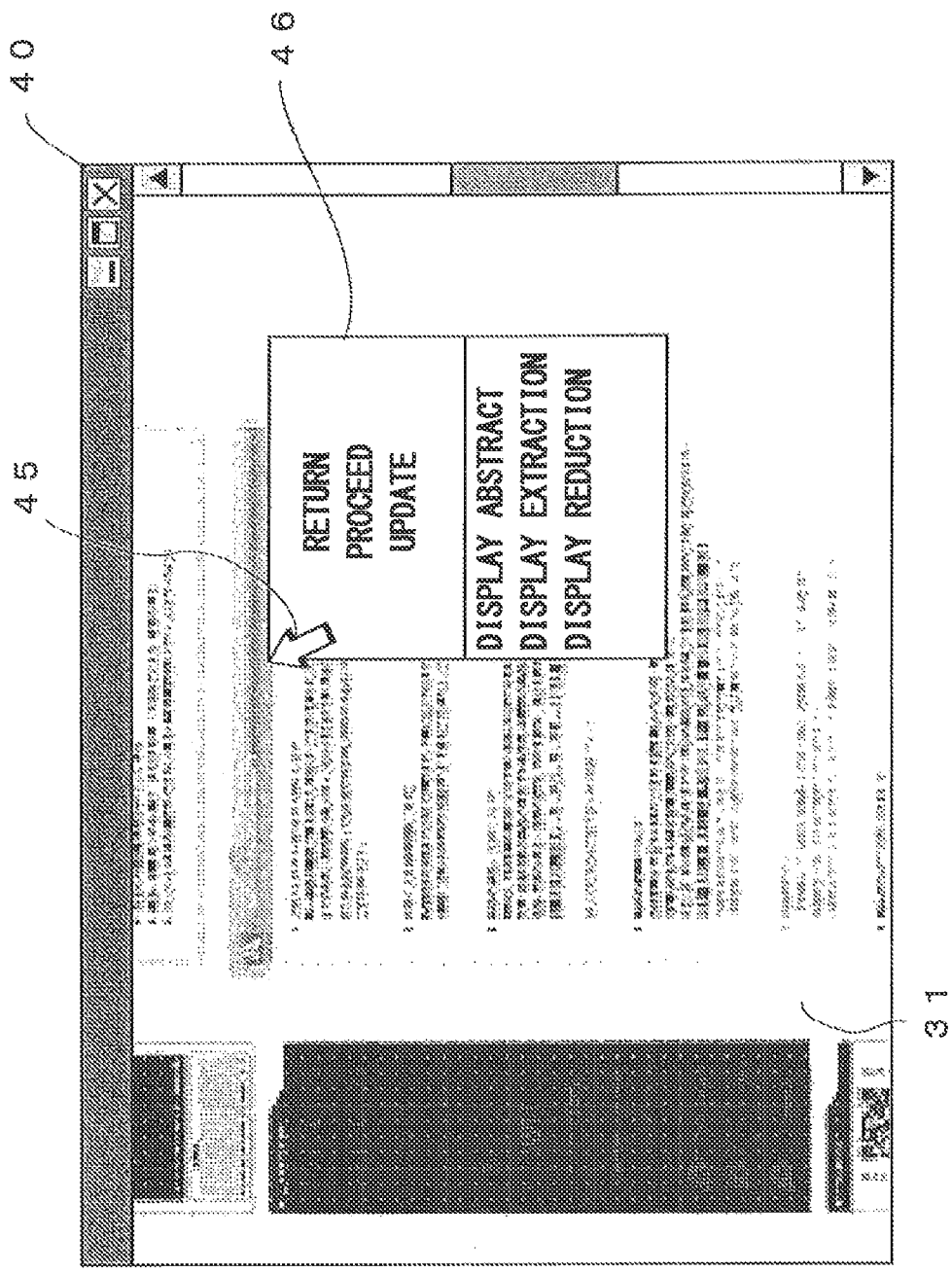
FIG. 7 is a schematic view illustrating an example of a screen for displaying condensed information on the terminal in FIG. 1.
Figure 8:
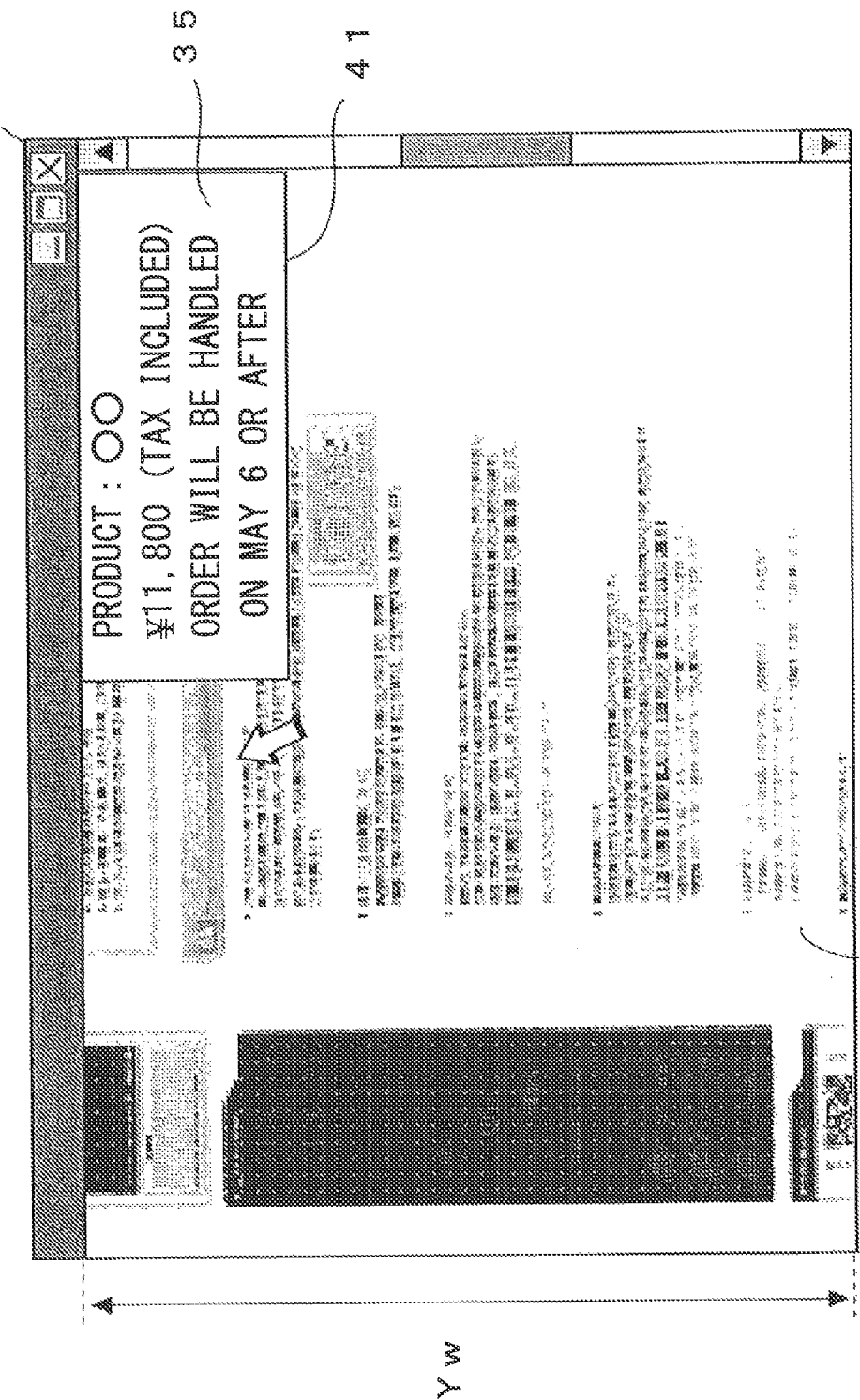
FIG. 8 is a schematic view illustrating an example of condensed information displayed on the terminal in FIG. 1.

FIG. 4 is a schematic view illustrating an example of content information provided by the information providing server 10. FIG. 5 is a sequence diagram illustrating an operation example of displaying condensed information in the information display system 1. FIG. 6 is a schematic view illustrating an example of content information displayed on the terminal 20. FIG. 7 is a schematic view illustrating an example of a screen for displaying condensed information on the terminal 20. FIG. 8 is a schematic view illustrating an example of condensed information displayed on the terminal 20.

First, the terminal 20 receives content information from the information providing server 10. As illustrated in FIG. 4, this content information 30 (an example of content information to be displayed on the display unit 23) includes the amount of information which cannot settle in the screen of the display unit 23 of the terminal 20. The content information 30 is divided into a display area 31 (an example of a display portion) displayed in a screen of a web browser 40, a displayed area 32 (an example of a non-display portion) and an undisplay area 33 (an example of a non-display portion).

The display area 31 is an area of Y1 to Y2 on a Y coordinate. The displayed area 32 is an area of 0 to Y1 on the Y coordinate, and is an area which is already displayed in the screen of the web browser 40 and is not currently displayed in the screen of the web browser 40 by a user's operation such as scrolling. The undisplay area 33 is an area of Y2 to Ymax on the Y coordinate, and is an area which is not yet displayed in the screen of the web browser 40. Further, the displayed area 32 and the undisplay area 33 are non-display areas (an example of non-display portions) which are not currently displayed in the screen of the web browser 40.

In addition, the state illustrated in FIG. 4 is a state where the user scrolls the portion of the content information 30 in the Y direction by means of the operation unit 24 and displays the portion of the content information 30 in the screen of the web browser 40 displayed on the display unit 23. That is, the state illustrated in FIG. 4 is a state where the screen is scrolled from the state of Y=0 to the state of Y=Y1 of the content information 30. Further, when content information is scrolled in the X direction in the display unit 23, a position coordinate in the X direction is display position information.

As illustrated in FIG. 5, the terminal 20 measures and stores operation position information for specifying a gaze area (an example of a gaze portion of a display portion gazed by the user) (step S1). Specifically, as illustrated in FIG. 6, the system control unit 26 of the terminal 20 measures operation position information such as a motion of user's scrolling in the display area 31 of the web browser 40 by means of the operation unit 24 or a trajectory 45a of a pointer 45 moving on the display unit 23, and stores the operation position information in the memory unit 22. Thus, the system control unit 26 of the terminal 20 functions as an example of an operation position information acquiring means that acquires operation position information related to an operation position operated on the screen by the user (for example, scrolling, moving of a pointer, clicking, pinch-in or pinch-out) in the display portion (display area 31).

Next, the terminal 20 acquires a condensed display trigger (step S2). Specifically, the system control unit 26 of the terminal 20 receives a signal such as right clicking of the mouse of the operation unit 24 and, as illustrated in FIG. 7, causes a menu display frame 46 to be displayed on content of the display area 31 in the web browser 40. In the menu display frame 46, "display abstract", "display extraction" and "display reduction" for displaying condensed information is displayed. When "display abstract" in the menu display frame 46 is selected, the system control unit 26 of the terminal 20 acquires an abstract display trigger as an example of a condensed display trigger. In addition, the system control unit 26 of the terminal 20 acquires an extraction display trigger when "display extraction" is selected, and acquires a reduced display trigger when "display reduction" is selected.

Next, the terminal 20 acquires display area information (step S3). Specifically, to acquire display area information of the content information 30, the system control unit 26 of the terminal 20 acquires a position coordinate (Y1, Y2) of the display area 31 in which the content information 30 is displayed in the web browser 40 in the Y direction. Much Specifically, the system control unit 26 of the terminal 20 acquires the position coordinate of the display area 31 of the content information 30 from, for example, information of a graphic region of the RAM 26c as an example of display position information. Thus, the system control unit 26 of the terminal 20 acquires display position information for specifying the display area 31 displayed on the display unit 23 among the content information 30. Meanwhile, as illustrated in FIG. 4, Y2-Y1 is a display width Yw of the web browser 40 opened on the display unit 23 in the Y direction.

Next, the system control unit 26 of the terminal 20 determines operation position information related to an operation position operated on the screen by the user. For example, from information of a motion of scrolling in the web browser 40 or information of the trajectory 45a of a motion of the pointer 45 stored in memory unit 22, operation position information for specifying the gaze area 34 gazed in the display area 31 is determined. The system control unit 26 of the terminal 20 uses, for example, a Y value (for example, Y=Ya or Y=Yb) at which scrolling stops or a scrolling direction changes, or information of the position of the pointer 45 for operation position information. In addition, information of the position of the pointer 45 includes, for example, a feature point of the trajectory 45a, such as the maximum value or the minimum value of the trajectory 45a of the pointer 45 in the X-Y direction, a return position of the trajectory 45a and a point at which the pointer 45 stays for a long time. Further, in step S1, when, for example, scrolling stops or the scrolling direction changes, the Y value or information of the position of the pointer 45 may be stored in the memory unit 22. Furthermore, as illustrated in FIG. 4, in some cases, a gaze area is a gaze area 34B gazed in the displayed area 32 which is already displayed as the display portion.

Next, the terminal 20 transmits information of a display area/gaze area (step S4). Specifically, the system control unit 26 of the terminal 20 transmits operation position information for specifying a gaze area, such as the position coordinate (Y1, Y2) of the display area 31 of the content information 30 in the Y direction or the position coordinate (Ya, Yb) of the gaze area 34 in the Y direction, to the information providing server 10 through the communication unit 21.

Next, the information providing server 10 receives information of a display area/gaze area (step S5). Specifically, the system control unit 14 of the information providing server 10 receives from the terminal 20, for example, display position information for specifying the display area 31 of the content information 30 displayed on the display unit 23 of the terminal 20, the position coordinate (Y1, Y2) of the display area 31 in the Y direction or the position coordinate (Ya, Yb) of the gaze area 34 in the Y direction, as an example of operation position information related to an operation position operated on the screen of the display area 31 by the user.

Next, the information providing server 10 specifies the gaze area (step S6). Specifically, the system control unit 14 of the information providing server 10 specifies the gaze area 34 from operation position information such as the position coordinate (Ya, Yb) in the Y direction. Further, as illustrated in FIG. 6, the system control unit 14 of the information providing server 10 may specify the gaze area 34a based on the maximum value or the minimum value of the trajectory 45a of the pointer 45 in the X-Y direction.

Next, the information providing server 10 extracts a feature element from the gaze area (step S7). Specifically, the system control unit 14 of the information providing server 10 extracts, for example, text information such as sentences or phrases or image information as an example of a feature element (a characteristic element of content in the gaze portion) from content of the gaze area 34 or the gaze area 34a. In this case, the system control unit 14 of the information providing server 10 extracts the feature element by applying an existing automatic abstract generating method to the content information 30 to extract a feature element or extracts the feature element according to a predetermined algorithm for extracting the feature element, such as an appearance frequency or an inverse appearance frequency of a word in content of the gaze area 34. Further, the system control unit 14 of the information providing server 10 may use for a feature element a phrase or image in the vicinity where the pointer 45 stays for a long time, based on operation position information.

Next, the information providing server 10 specifies an undisplay area (an example of an undisplay portion) (step S8). Specifically, the system control unit 14 of the information providing server 10 specifies the displayed area 32 and the undisplay area 33 (non-display areas 32 and 33) of the content information 30 which is not displayed on the display unit 23, from the position coordinate (Y1, Y2) of the display area 31 and the position coordinate (0, Ymax) of the content information 30. Much Specifically, the system control unit 14 of the information providing server 10 specifies the position coordinate (0, Y1) as position information of the displayed area 32, and the position coordinate (Y2, Ymax) as position information of the undisplay area 33.

Further, the system control unit 14 of the information providing server 10 specifies the undisplay area 33 as an undisplay area of content information which is not yet displayed on the display unit 23. This is because the user generally scrolls an undisplay area sequentially from Y=0 and it is assumed that the undisplay area 33 of content information is not yet displayed.

Meanwhile, the system control unit 14 of the information providing server 10 specifies the undisplay area 33 for the position coordinate (Y2, Ymax) of the undisplay area 33, based on the position coordinate of the display area 31 (Y1, Y2) and the initial position coordinate (0, Yw) which is an example of initial display position information indicating an initial display area of the content information 30 on the display unit 23.

Next, the information providing server 10 abstracts content of the undisplay area based on the feature element (step S9). Specifically, the system control unit 14 of the information providing server 10 generates abstract information by abstracting this portion after extracting a portion of text information or image information including the feature element in the undisplay area 33, generates an extraction after extracting a predetermined amount of text information or image information including the feature element, or generates a reduced image near the feature element in the undisplay area 33. Thus, the system control unit 14 of the information providing server 10 generates condensed information of content of the undisplay area according to a predetermined algorithm of generating condensed information such as abstract information, an extraction or a reduced image. In addition, the system control unit 14 of the information providing server 10 may specify text information or image information similar to the feature element in the undisplay area 33, and generate condensed information such as abstract information or a reduced image.

Alternately, the system control unit 14 of the information providing server 10 may divide the content information 30 of the undisplay area in predetermined units, find condensed information such as abstract information or reduced display in each unit and use condensed information such as abstract information having content which is the closest to the feature element, as condensed information to be displayed on the terminal 20. Further, when the feature element is an image, the system control unit 14 of the information providing server 10 uses a text described in, for example, a comment (ALT tag information) of an image for the feature element, and generates condensed information such as abstract information from the undisplay area based on this feature element. Furthermore, when the image is itself used for the feature element, the system control unit 14 of the information providing server 10 may extract image having a similar feature to a feature such as a size or a color of the image of the feature element, from content of the undisplay area.

Next, the information providing server 10 transmits condensed information (step S10). Specifically, the system control unit 14 of the information providing server 10 transmits condensed information such as abstract information, to the terminal 20 through the communication unit 11. Further, the system control unit 26 of the terminal 20 receives condensed information such as abstract information from the information providing server 10 through the communication unit 21.

Next, the terminal 20 displays condensed information (step S11). Specifically, as illustrated in FIG. 8, the system control unit 26 of the terminal 20 displays abstract information 35 which is an example of condensed information, in the abstract display frame 41 opened on content of the display area 31 in the screen of the web browser 40. In addition, a link is provided to the abstract information 35 and, when the link is clicked by, for example, the mouse of the operation unit 24, the system control unit 26 of the terminal 20 scrolls the screen of the web browser 40 and moves the screen to a portion which lists the content information 30 corresponding to the abstract information 35. Further, when "display extraction" is pointed in the menu display frame 46, an extraction at a portion including the feature element is displayed in a web page. Furthermore, the menu display frame 46 displays reduced display of reduced image information of a web page when "display reduction" is pointed.

As described above, according to the present embodiment, by receiving from the terminal 20 display position information for specifying the display area 31 of the content information 30 and operation position information for specifying the gazed gaze area 34 of the display area 31 or the gazed gaze area 34B of the displayed area 32, specifying the gaze areas 34 and 34B based on operation position information, extracts the feature elements from the gaze areas 34 and 34B, specifying the undisplay area 33 of content information which is not yet displayed on the display unit 23, from display position information, generating condensed information such as abstract information of content information included in the undisplay area 33, based on the feature element and transmitting condensed information such as abstract information to the terminal 20, when there is content information having the amount which does not settle in the screen, it is possible to easily check a portion of content related to the displayed portion, at a portion which is not displayed in the screen. Further, according to the present embodiment, it is possible to check information at a portion which is not displayed like the undisplay area 33.

Further, according to the present embodiment, instead of abstracting all portions (undisplay area 33) which are not simply seen or reducing all portions, it is possible to abstract the portion related to the portion (gaze areas 34, 34a and 34B) which is looked at and reduce the size of the portion and cause the portion to be displayed and, consequently, efficiently guide the user to a portion in which the user is interested and improve users' convenience.

Further, when the undisplay area 33 is specified based on display position information (for example, position coordinate (Y1, Y2)) and initial display position information (for example, initial display position information (0, Yw)) indicating an initial display area of content information in the display unit 23, the system control unit 14 of the information providing server 10 can provide a view of content information such as preceding pages to the users when the user easily specifies the portion which the user does not read and abstract or reduces only the portion which the user does not yet read, and more efficiently guide the user to a portion in which the user is interested and improve users' convenience.

In addition, the system control unit 26 of the terminal 20 may use for a gaze area a region selected in a rectangular shape or a region encircled by the pointer 45 freehand or a trajectory touched on the screen by the user. In case of the region encircled by the trajectory, the gaze area may be a rectangular region including this region. Further, the system control unit 26 of the terminal 20 may use for a gaze area the vicinity of a position (stay point) at which the pointer stays for a predetermined period or more, or the vicinity of the position at which a button is pressed by clicking the mouse, in the screen of the web browser 40. Particularly, in case of a touch panel, the system control unit 26 of the terminal 20 may use for a gaze area a position at which an input is provided through the touch panel, such as a touched position or the vicinity of a portion pinched in or pinched out Operation position information, may be coordinates at four corners when the region, is selected in a rectangular shape, or coordinates at four corners of a rectangular shape including a region when the region is encircled freehand. Further, operation position information may be a coordinate of a position at which the pointer stays, a coordinate of a position at which a click button is pressed or a coordinate of a position at which an input is provided through the touch panel. Further, operation position information may be data itself of the trajectory.

Next, a modified example of condensed information displayed on the display unit 23 of the terminal 20 will be described using FIGS. 9 and 10.

Figure 9:
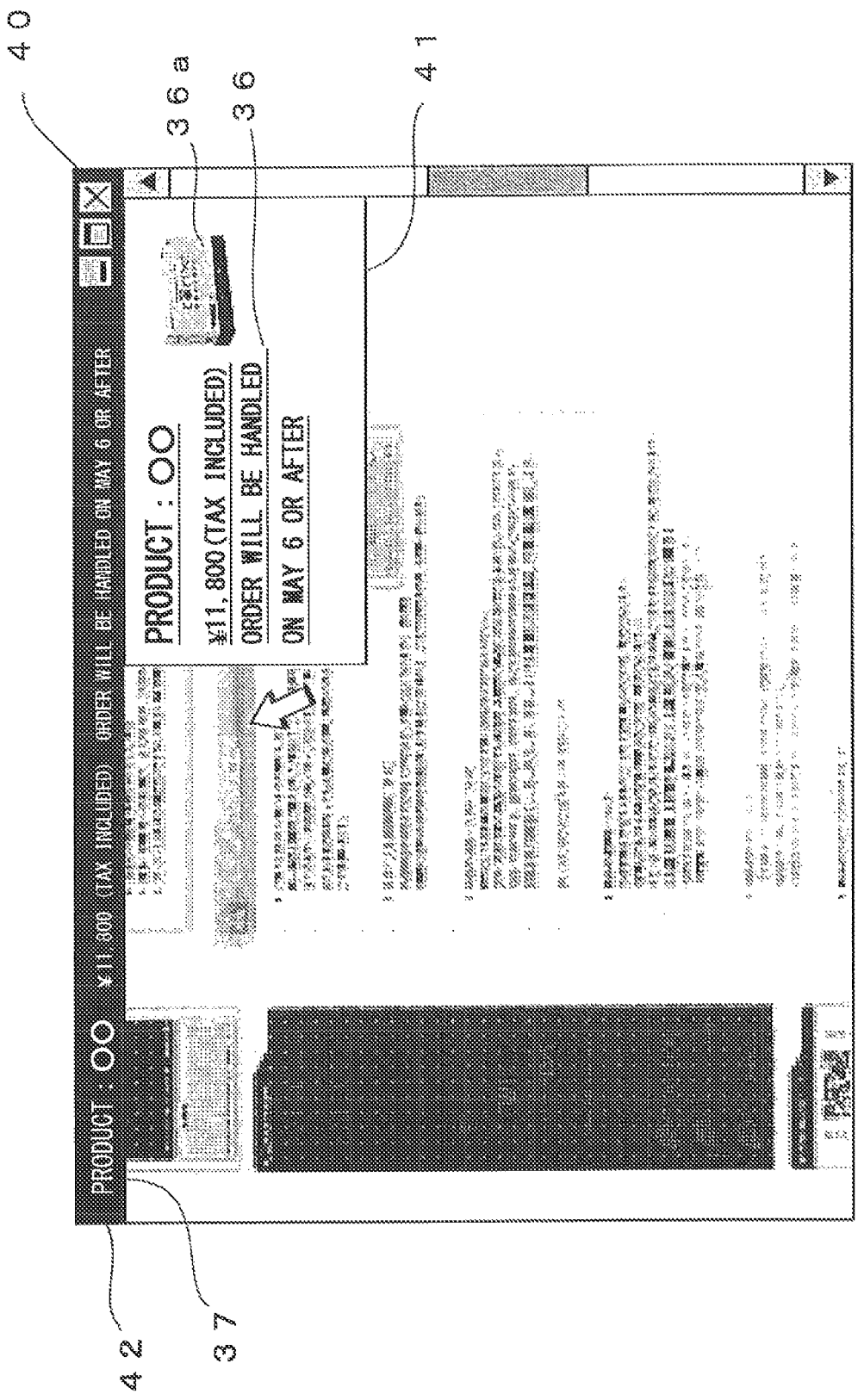
FIG. 9 is a schematic view illustrating a modified example of condensed information displayed on the terminal in FIG. 1.

FIG. 9 is a schematic view illustrating a modified example of condensed information displayed on the terminal 20. FIG. 10 is a schematic view illustrating a modified example of condensed information displayed on the terminal 20.

As illustrated in FIG. 9, the abstract information 36 including image data 36a may be displayed in the abstract display frame 41 of the web browser 40. As illustrated in FIG. 10, abstract information 37 may be displayed in a title bar 42 of the web browser 40.

Figure 10:
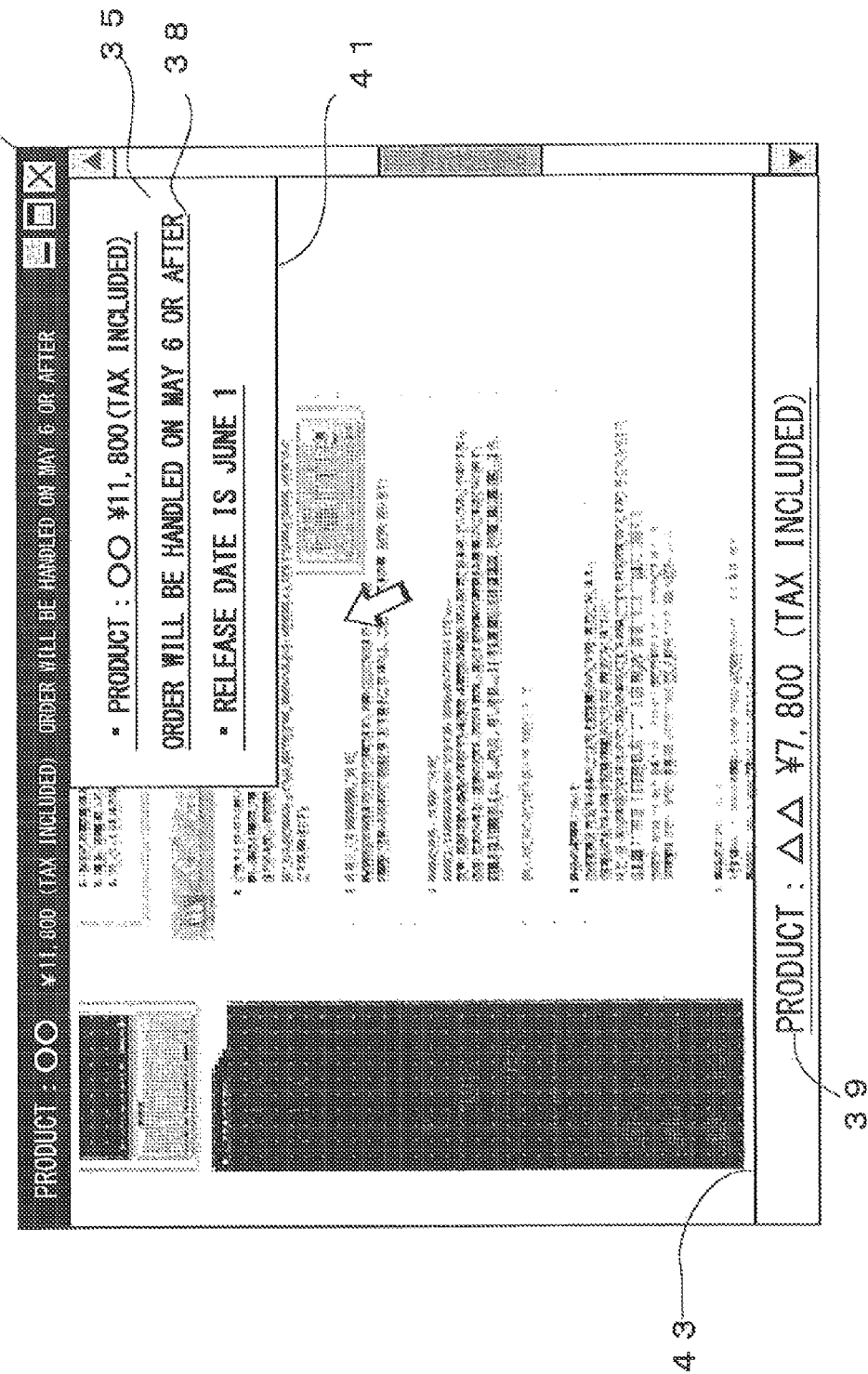
FIG. 10 is a schematic view illustrating a modified example of condensed information displayed on the terminal in FIG. 1.

Next, as illustrated in FIG. 10, the first abstract information 35 and the second abstract information 38 may be displayed in the abstract display frame 41 of the web browser 40. When the order of the first abstract information 35 and the second abstract information 38 is the order listed in the content information 30, content of the content information 30 can be more easily comprehended in the undisplay area 33.

Next, a modified example of content information will be described using FIG. 11.

Figure 11:
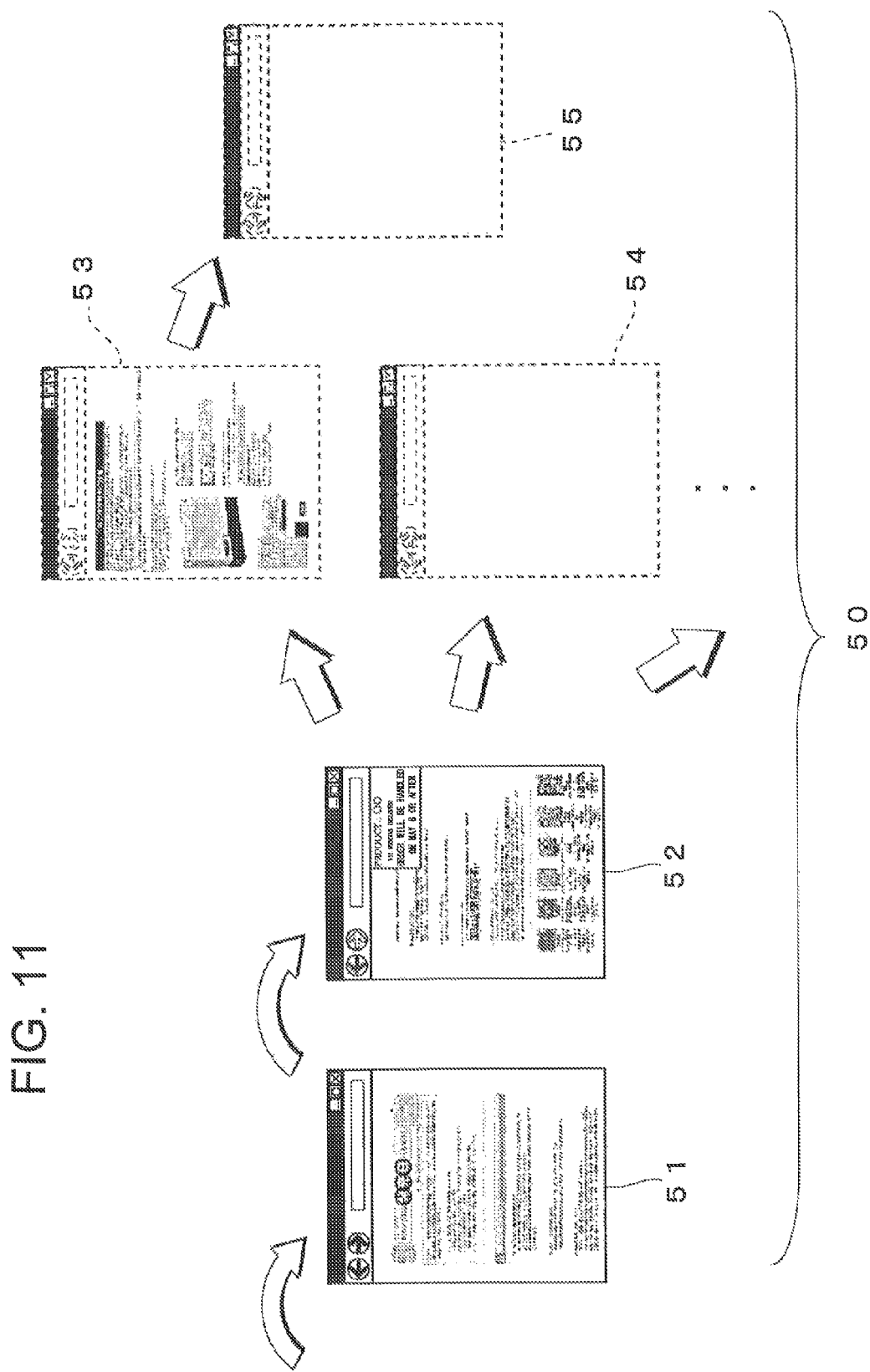
FIG. 11 is a schematic view illustrating a modified example of content information provided by the information providing server in FIG. 1.

FIG. 11 is a schematic view illustrating a modified example of content information provided by the information providing server 10.

As illustrated in FIG. 11, when a web page transitions from a web page 51 to a web page 52, content information 50 of web pages 51 to 55 including the web pages 53, 54 and 55 to which the web page can transit from the web page 52 may be content information having the amount which does not settle in the screen. The web page 52 corresponds to a display area, the web page 51 having information of a portion which is not displayed by clicking of a mouse corresponds to a displayed area and the web pages 53, 54 and 55 correspond to undisplay areas. In this case, the system control unit 14 of the information providing server 10 specifies an undisplay area of content information which is not yet displayed on the display unit 23, referring to, for example, the content DB 12a. In addition, when a display area, a displayed area or a non-display area such as an undisplay area is specified, the system control unit 14 of the information providing server 10 may use a browsing history acquired from Cookie or may use a browsing history extracted from the browsing history DB (not illustrated) which the information providing server 10 has.

Figure 12:
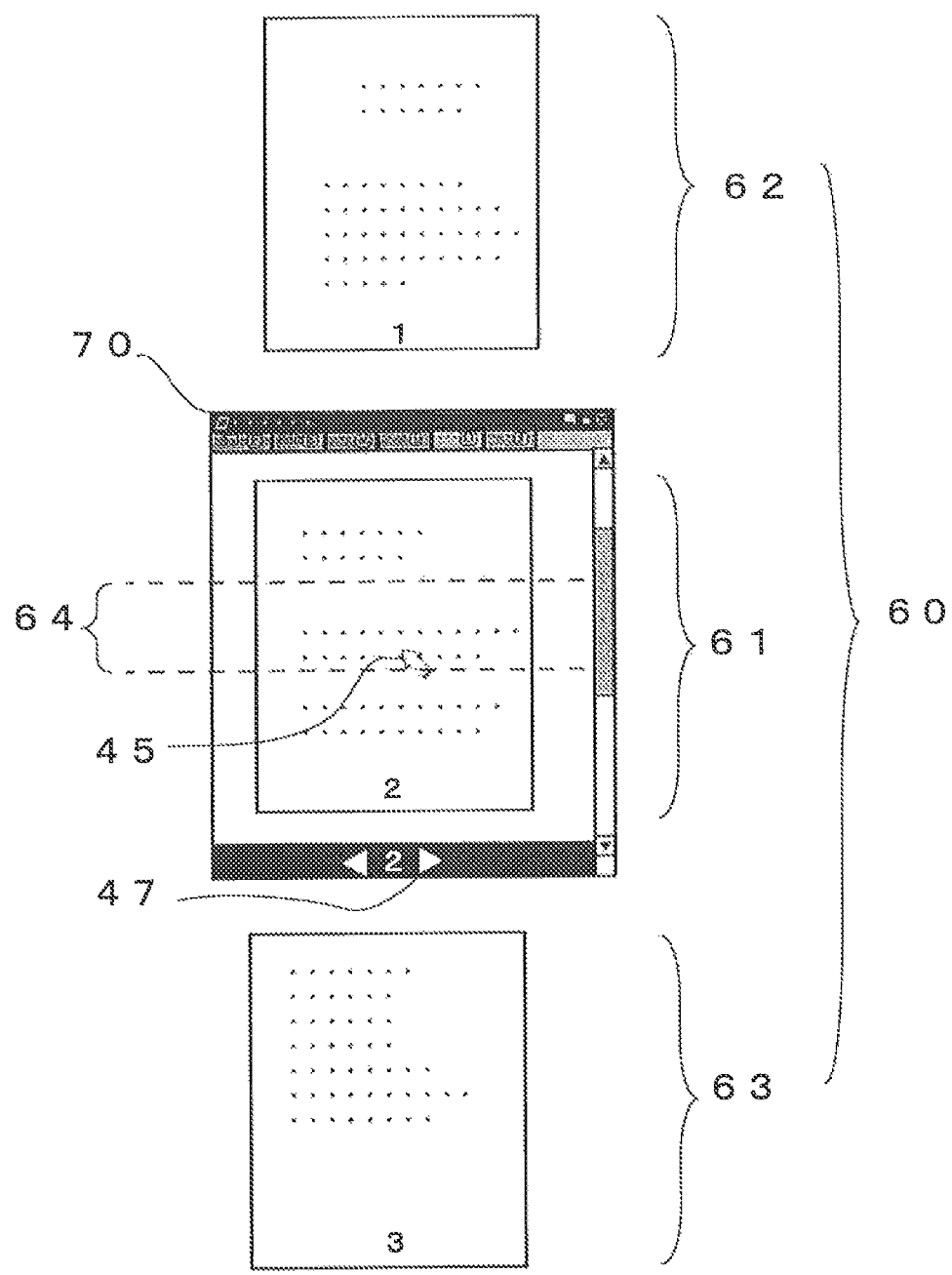
FIG. 12 is a schematic view illustrating a modified example of content information provided by the information providing server in FIG. 1.

In addition, an example of content information may be content of electronic data which can be browsed by a word processor or an application such as table calculation. For example, as illustrated in FIG. 12, when document 60 (an example of content information) is over three pages, the system control unit 26 of the terminal 20 specifies a gaze portion 64 from, for example, a trajectory of the pointer 45 as in step S6 in a displayed portion 62 on the first page which is already displayed on a screen 70 of an application or a display portion 61 on the second page which is displayed on the screen 70 of the application. Further, the system control unit 26 of the terminal 20 extracts a feature element from a gaze portion 64 as in step S7, and abstracts content on the third page of an undisplay portion 63 based on the feature element as in step S9 (step S9). In addition, the system control unit 26 of the terminal 20 decides whether or not a page is displayed, by scrolling by means of the mouse of the operation unit 24 or, for example, a history of an operation of a page operation button 47 for displaying content on a next page or a previous page.

Further, in step S2, the operation unit 24 of the terminal 20 or the system control unit 14 of the information providing server 10 may acquire a reduced display trigger such as abstract display by acquiring input decision information when an operation is not inputted for a given period and an operation is inputted, again, based on input information such as operation information of the operation unit 24 of the terminal 20.

Specifically, the system control unit 26 of the terminal 20 decides whether or not the web browser 40 is operated by the operation unit 24 such as the mouse or the keyboard to decide whether or not an input is provided from the operation unit 24. Further, the system control unit 26 of the terminal 20 enters a waiting state until no input is provided from the operation unit 24 when an input is provided from the operation unit 24

Next, to acquire a position coordinate in a state where no input is provided from the operation unit 24, the system control unit 26 of the terminal 20 acquires, for example, the position coordinate (Y1, Y2) of the display area 31 which displays the content information 30 in the web browser 40 in the Y direction as in step S3. For example, the system control unit 26 of the terminal 20 acquires the position coordinate of, for example, the display area 31 of the content information 30 as an example of display position information from, for example, information of a graphic region of the RAM 26c.

Next, to decide whether or not a state where no input is provided from the operation unit 24 passes for a predetermined period or more, the system control unit 26 of the terminal 20 decides whether or not an input is provided from the operation unit 24 and acquires, for example, new display position information when a predetermined period or more does not pass. This is because the user checks a use situation where the user currently and actually uses the application of the terminal 20 without, for example, leaving from a seat. Particularly, the system control unit 26 of the terminal 20 checks whether or not the web browser 40 is operated. For example, the system control unit 26 of the terminal 20 decides whether or not the web browser 40 is operated while the user is working on another window screen in a state where the web browser 40 is opened.

Further, when the input means captures a motion of a person like a camera or senses a person like an infrared ray sensor, the system control unit 26 of the terminal 20 may check the use situation of the user by analyzing an image captured by the camera or deciding information from the sensor, and decide that no input is provided for a given period or more and an input is provided again.

Next, when a predetermined period or more passes, the system control unit 26 of the terminal 20 transmits, for example, the position coordinate (Y1, Y2) of the display area 31 of the content information 30 in the Y direction and the position coordinate (Ya, Yb) of the Gaze area 34 in the Y direction, to the information providing server 10 through the communication unit 21 as in step S4, and the information providing server 10 performs processings of step S5 to step S10.

Thus, based on operation information of the operation unit 24 of the terminal 20, operation decision information is acquired when an operation is not performed for a given period and the operation is performed again and condensed information such as abstract information is transmitted to the terminal when operation decision information is acquired, if an operation is not performed by, for example, a mouse for a given period, it is possible to estimate that the user forgets content which is left and is already looked at, and automatically present condensed information such as an abstract at a more adequate timing.

Further, the system control unit 26 of the terminal 20 may execute an information display program of displaying condensed information on the display unit 23 of the terminal 20 by an agent of, for example, a web browser. In this case, the system control unit 26 of the terminal 20 acquires display position information for specifying the display area 31 displayed on the display unit 23 and, from the operation unit 24, operation position information for specifying the gaze areas 34 and 34a gazed in the display area 31 among the content information 30 displayed on the display unit 23, specifies the undisplay area 33 which is not displayed on the display unit 23, among the content information from display position information, specifies the gaze areas 34 and 34a based on operation position information, extracts the feature element from the gaze areas 34 and 34a, specifies the undisplay area 33 of content information which is not yet displayed on the display unit 23, from display position information, generates condensed information of content information included in the undisplay area 33, based on the feature element, and causes condensed information such as abstract information to be displayed on the display unit 23. Particularly, this is applied to, for example, information inputted to a word processor as the content information 30. Further, the function of, for example, displaying condensed information may be added to, for example, web browser add-on.

Further, to cause condensed information such as abstract information to be displayed on the display unit 23, the system control unit 14 of the information providing server 10 generates a web page or a program displaying the abstract display frame 41 opened on content of the display area 31, on the screen of the web browser 40 and displaying the abstract information 35 in the abstract display frame 41 and transmits condensed information such as abstract information to the terminal 20.

Furthermore, the system control unit 14 of the information providing server 10 may receive operation information of the operation unit 24 of the terminal 20 from the terminal 20, decide that whether or not the operation is not performed for a given period and is operated again, based on operation information, acquire operation decision information when it is decided as a decision result that the operation is performed again, and transmit condensed information such as abstract information to the terminal 20 when operation decision information is acquired.

Still further, the system control unit 14 of the information providing server 10 may receive from the terminal 20 information of a motion of scrolling in the web browser 40 by the operation unit 24 measured in the terminal 20 or information of the trajectory 45a of the pointer 45 moving on the display unit 23, and perform operations in step S1 to step S4.

Moreover, in step S8, the system control unit 14 of the information providing server 10 may limit an area (an area narrower than the undisplay area 33) to a portion related to the feature element based on the feature element when the undisplay area 33 is specified. In this case, the system control unit 14 of the information providing server 10 increases a processing speed, because the portion to abstract (a portion to condense) becomes narrow.

Next, a modified example of condensed information to be displayed on the display unit 23 of the terminal 20 will be described using FIGS. 13 and 14.

Figure 13:
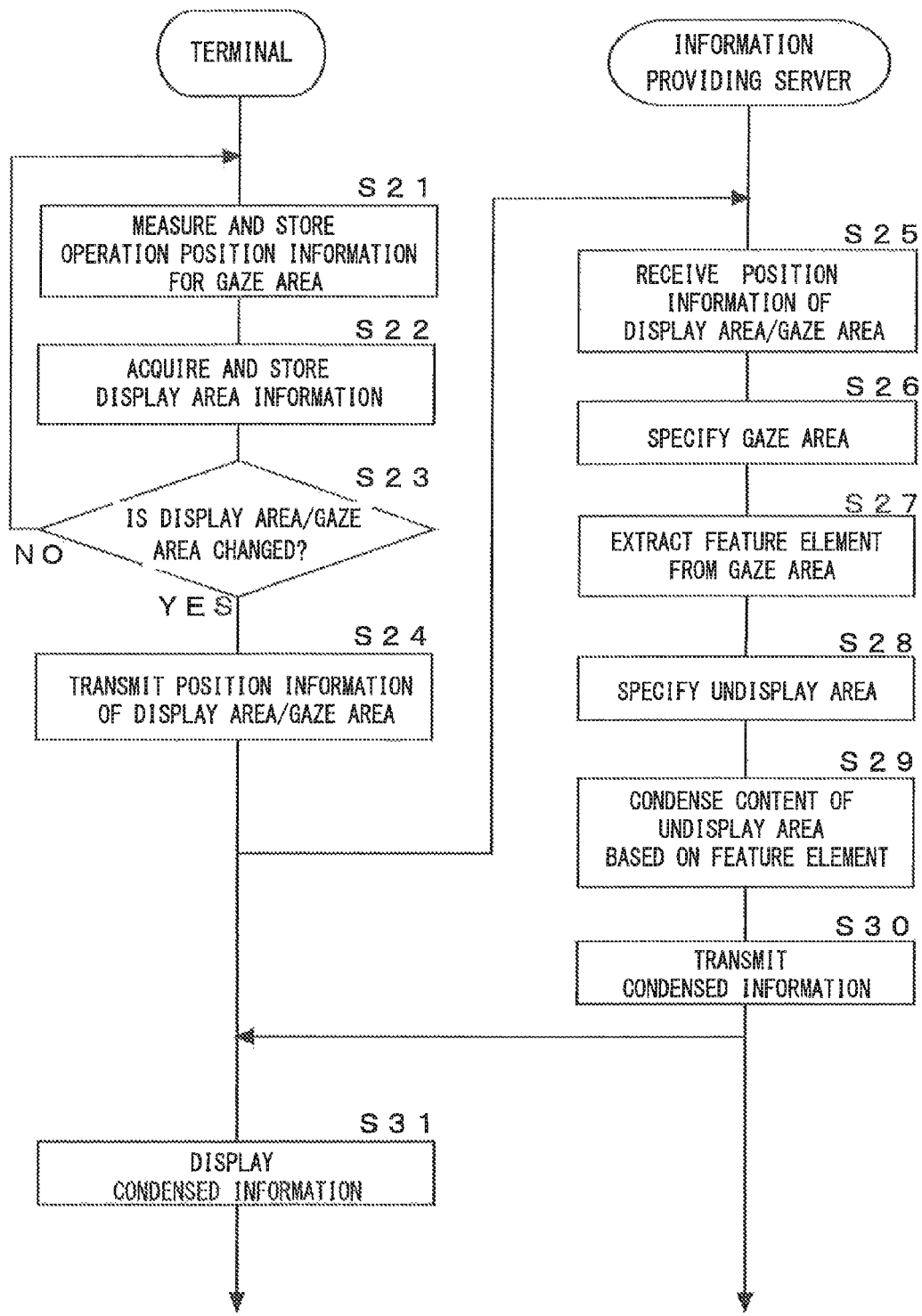
FIG. 13 is a sequence diagram illustrating a modified example of an operation of displaying condensed information in the information display system in FIG. 1.

FIG. 13 is a sequence diagram illustrating a modified example of an operation of displaying condensed information in the information display system 1. FIG. 14 is a schematic view illustrating a modified example of a gaze area in content information in FIG. 6.

First, as illustrated in FIG. 13, the terminal 20 measures and stores operation position information for specifying a gaze area as in step S1 (step S21).

Next, the terminal 20 acquires and stores display area information (step S22). The system control unit 26 of the terminal 20 acquires and stores display area information in the memory unit 22 as in step S3. For example, as illustrated in FIG. 14, the position coordinate (Y3, Y4) of the display area 31 in the Y direction is acquired and stored in the memory unit 22.

Next, the terminal 20 decides whether or not the display area or the gaze area is changed (step S23). As illustrated in FIG. 14, the system control unit 26 of the terminal 20 detects fluctuation of the display area 31 resulting from a motion of, for example, scrolling in the web browser 40 by the operation unit 24, or fluctuation of a gaze area resulting from, for example, a motion or a trajectory of the pointer 85.

For the display area, for example, the system control unit 26 of the terminal 20 compares the position coordinate (Y1, Y2) of the display area before scrolling stored in the memory unit 22 in the Y direction and the acquired position coordinate (Y3, Y4), and decides that the display area 31 is changed when the position coordinate equal to or more than a predetermined value moves. Further, when a display width Yw' (=Y4−Y3) fluctuates over a predetermined or more compared to the display width Yw (=Y2−Y1), the system control unit 26 of the terminal 20 may decide that the display area 31 is changed. In addition, when the web browser 40 starts being scrolled and scrolling stops for a predetermined period and, for example, when a scroll signal is received from the operation unit 24 and a scroll signal is not received for a predetermined period, the system control unit 26 of the terminal 20 may also decide that the display area 31 is changed.

Next, for the gaze area, for example, the system control unit 26 of the terminal 20 specifies a gaze area 80 before scrolling, from a start point (Y=Yc) and an end point (Y=Yd) of a trajectory 85a of the pointer, and specifies a gaze area 81 after scrolling from a return point (Y=Ye) and an end point (Y=Yf) of the trajectory 85a of the pointer. Further, the system control unit 26 of the terminal 20 compares the position coordinate (Yc, Yd) of the gaze area 80 in the Y direction and the position coordinate (Ye, Yf) of the gaze area 81 in the Y direction, and decides that the gaze area is changed when the position coordinate equal to or more than a predetermined value moves.

In addition, in FIG. 14, the movement of the pointer from a pointer 85 to a pointer 86 shows the movement of the pointer when the screen is moved by scrolling using the mouse, the pointer moves from the position of a pointer 86 to the position of a pointer 87 via a trajectory 86a and a trajectory 87a and moves to the position of a pointer 88 via a trajectory 88a.

Further, when a stay point of, for example, a pointer fluctuates, a pointer moves or a click button of a mouse is newly pressed, the system control unit 26 of the terminal 20 may decide that the gaze area is changed. Furthermore, when the gaze area is rectangular or when the coordinates at four corners of a rectangular shape fluctuate, the system control unit 26 of the terminal 20 may decide that the gaze area is changed. Still further, when the position at which an input is provided through the touch panel is different from a predetermined period, the system control unit 26 of the terminal 20 may decide that the gaze area is changed.

Meanwhile, an example of fluctuation of a gaze area includes expansion or reduction of the gaze area or movement of the gaze area. An example of expansion of the gaze area includes a case where Yd of the position coordinate (Yc, Yd) of the gaze area 80 in the Y direction increases or a case where Yc decreases. Further, an example of movement of the gaze area includes movement from the gaze area 80 to the gaze area 81. Although there is no overlapping area from the gaze area 80 to the gaze area 81 in FIG. 14, there may be an overlapping area.

Next, the terminal 20 transmits position information of a display area/gaze area (step S24). As in step S4, the system control unit 26 of the terminal 20 transmits operation position information such as the position coordinate (Y3, Y4) of the display area 31 of the content information 30 in the Y direction and the position coordinate (Ye, Yf) of the gaze area 81 in the Y direction, to the information providing server 10. Further, the system control unit 26 of the terminal 20 may transmit coordinate information of X coordinate values and Y coordinate values of positions indicated by the pointers 86, 87 and 88, coordinate position information of X coordinate values and Y coordinate values of positions at which the curvature radius is a predetermined value or less such as start points, end points and return points of trajectories of the trajectories 86a, 87a and 88a, and coordinate information of the trajectories 86a, 87a and 88a themselves. Furthermore, the system control unit 26 of the terminal 20 may also transmit operation position information of the position coordinate (Ye, Yd) of the gaze area 80 before scrolling in the Y direction, together with operation position information of the gaze area 81 after scrolling.

In addition, the system control unit 26 of the terminal 20 may transmit difference information of the display area or difference information of the gaze area. For example, the system control unit 26 of the terminal 20 transmits difference information such as a difference position coordinate (Y3−Y1, Y4−Y2) of the display area 31 in the Y direction, and a difference position coordinate (Ye−Yc, Yf−Yd) of the gaze area in the Y direction. Further, the system control unit 26 of the terminal 20 may transmit difference information of the gaze area 81 for the display area 31. For example, difference information of the difference position coordinate (Ye−Y3, Yf−Y3) of the display area 31 based on a start point 13 in the Y direction may be transmitted.

Next, the information providing server 10 receives position information of a display area/gaze area as in step S5 (step S25).

Next, the information providing server 10 specifies the gaze area (step S26). Specifically, the system control unit 14 of the information providing server 10 specifies the gaze area 81 from operation position information such as the position coordinate (Ye, Yf) in the Y direction. Further, the system control unit 14 of the information providing server 10 may specify the gaze area 81a from the trajectories 86a and 87a of the pointers 86 and 87 as illustrated in FIG. 14. For example, the system control unit 14 of the information providing server 10 may perform, for example, image processing and specify from the content information 30 a text region above (Y direction) or in the vicinity of the end point of the trajectory 87a (the position indicated by the pointer 87) which is an example of the position at which the pointer stays for a predetermined period or a rectangular area (gaze area 81*a*) which encircles a region which is not empty such as an image region, based on coordinate information of an end point of the trajectory 87*a*. Further, the system control unit 14 of the information providing server 10 may specify the gaze area 82*a* from a rectangular area which encircles, for example, a text region below (−Y direction) or in the vicinity of the position indicated by the pointer 88. Furthermore, the system control unit 14 of the information providing server 10 may find the gaze area 82 from the specified gaze area 82*a*. In addition, the system control unit 14 of the information providing server 10 may specify the gaze area 80*a* from a rectangular area which encircles, for example, a text region above or in the vicinity of the position indicated by the Y pointer 85.

Next, the information providing server 10 extracts the feature element from the gaze areas 81 and 82 (gaze areas 81*a* and 82*a*) as in step S7 (step S27). In addition, the system control unit 14 of the information providing server 10 may extract the feature element from both of the gaze area 81 (81*a*) and the gaze area 82 (82*a*), and extract the feature element prioritizing one of the gaze areas. For example, the system control unit 14 of the information providing server 10 extracts the feature element only from the gaze area 82 (82*a*) gazed after the gaze area 81 (81*a*). Unlike FIG. 14, when the gaze area 81 (81*a*) and the gaze area 82 (82*a*) overlap, an area in which the gaze area 81 (81*a*) and the gaze area 82 (82*a*) overlap may be a gaze area from which the feature element is extracted. Thus, by narrowing the gaze area from which the feature element is extracted, it is possible to narrow the information amount and display information which reflects user's preference more.

Next, the information providing server 10 specifies an undisplay area as in step S8 (step S28).

Next, the information providing server 10 condenses content of an undisplay area based on the feature element as in step S9 (step S29).

Next, the information providing server 10 transmits condensed information as in step S10 (step S30).

Next, the terminal 20 displays condensed information as in step S11 (step S31).

As described above, the information display system 1 can easily check a portion of content related to a displayed portion, at a portion which is not automatically displayed in the screen even if the user does not point display of condensed information, when the information display system 1 decides whether or not a display portion or a gaze portion is changed, based on operation position information, generates condensed information in case that the display portion (display area 31) or the gaze portion (gaze area 80) is changed, and displays condensed information.

In addition, the above embodiment and the modified example may be implemented by the terminal 20 alone. For example, the system control unit 26 of the terminal 20 may specify the gaze area in step S6 (S26) (craze portion deciding means), extract a feature element from the gaze area in step S7 (S27) (feature element extracting means), specify an undisplay area in step S8 (S28) (undisplay portion specifying means), and condense content of the undisplay area based on the feature element in step S9 (S29) (condensed information generating means).

Further, the above embodiment and modified example may be realized by adding on a program in a web browser of the terminal 20. For example, the add-on program may execute: a display position information acquiring step (corresponding to step S3 and step S23) of acquiring display position information for specifying a display portion of content information displayed on the display means, among content information to be displayed on the display means; an operation position information acquiring step (corresponding to step S1 and step S21) of acquiring operation position information related to an operation position operated on a screen by the user in the display portion; a gaze portion specifying step (corresponding to step S6 and step S23) of specifying the gaze portion gazed by the user in the display portion, based on reoperation position information; an undisplay portion specifying step (corresponding to step S8 and step S8) of specifying the undisplay portion of content information which is not yet displayed on the display means, from display position information; and a condensed information displaying step (corresponding to step S11 and step S31) of displaying condensed information obtained by condensing content information included in the undisplay portion based on the feature element extracted from the gaze portion, on the display means. In this case, for example, the information providing server 10 executes: a feature element extracting step of extracting the feature element from the gaze portion; and a condensed information generating step of generating condensed information of content information included in the undisplay portion, based on the feature element.

Further, the present invention is by no means limited to the above embodiment. The above embodiment is an illustration, and all are included in a technical range of the present invention as long as these employ a substantially same configuration as a technical idea recited in the claims of the present invention and provide the same function and effect.

DESCRIPTION OF REFERENCE NUMERALS

1: INFORMATION DISPLAY SYSTEM
3: NETWORK
10: INFORMATION PROVIDING SERVER (INFORMATION PROVIDING APPARATUS)
12*a*: CONTENT DB
12*b*: CONDENSED INFORMATION DB
20: TERMINAL (INFORMATION DISPLAY APPARATUS)
23: DISPLAY UNIT (DISPLAY MEANS)
24: OPERATION UNIT
30, 50, 60: CONTENT INFORMATION
31: DISPLAY AREA (DISPLAY PORTION)
33: UNDISPLAY AREA (UNDISPLAY PORTION)
34, 34*a*, 80, 80*a*, 81, 81*a*, 82, 82*a*: GAZE AREA (GAZE PORTION)
35: CONDENSED INFORMATION
52: WEB PAGE (DISPLAY PORTION)
53, 54, 55, 63: WEB PAGE (UNDISPLAY PORTION)
61: DISPLAY PORTION
63: UNDISPLAY PORTION
64: GAZE PORTION

The invention claimed is:
1. An information display system comprising:
at least one memory operable to store program code;
at least one processor operable to read the program code and operate as instructed by the program code, the program code including:
display code configured to cause the at least one processor to display, on a display, content information;
display position information acquiring code configured to cause the at least one processor to acquire display position information for specifying a display portion of the content information displayed on the display among content information to be displayed on the display;

operation position information acquiring code configured to cause the at least one processor to acquire operation position information for specifying a position at which an operation is operated, by a user, on a first content of the display portion currently displayed on a screen;

gaze portion specifying code configured to cause the at least one processor to specify a gaze portion gazed by the user in the first content of the display portion currently displayed, based on the position specified by the operation position information;

feature element extracting code configured to cause the at least one processor to extract a feature element of a second content in the gaze portion from the gaze portion, the second content in the gaze portion being included in the first content of the display portion currently displayed;

undisplay portion specifying code configured to cause the at least one processor to specify an undisplay portion of the content information which is assumed not yet to be displayed on the display, from the display position information;

condensed information generating code configured to cause the at least one processor to generate condensed information obtained by condensing, based on the feature element, content information of third content, which is determined as being included in the undisplay portion based on position information of the third content and the display position information acquired by the display position information acquiring code;

condensed information display code configured to cause the at least one processor to display the condensed information on the display, input code configured to cause the at least one processor to receive an input and acquire input information; and input decision information acquiring code configured to cause the at least one processor to acquire input decision information indicating that no input is received for a given period and an input is received again, based on the input information acquired by the input code, wherein the condensed information display code causes the at least one processor to automatically display the condensed information on the display when acquiring the input decision information indicating that no input is received for the given period and the input is received again.

2. The information display system according to claim 1, wherein the undisplay portion specifying code causes the at least one processor to specify the undisplay portion, based on the display position information and initial display position information indicating an initial display portion of the content information in the display.

3. The information display system according to one of claim 1, further comprising a determining code configured to cause the at least one processor to determine whether or not the display portion or the gaze portion is changed, based on the operation position information, wherein, when the display portion or the gaze portion is changed, the condensed information generating code causes the at least one processor to generate the condensed information, and the condensed information display code causes the at least one processor to display the condensed information.

4. An information display method of displaying information comprising:

a display position information acquiring step of acquiring display position information for specifying a display portion of the content information displayed on a display among content information to be displayed on the display;

an operation position information acquiring step of acquiring operation position information for specifying a position at which an operation is operated, by a user, on a first content of the display portion currently displayed on a screen;

a gaze portion specifying step of specifying a gaze portion gazed by the user in the first content of the display portion currently displayed, based on the position specified by the operation position information;

a feature element extracting step of extracting a feature element of a second content in the gaze portion from the gaze portion, the second content in the gaze portion being included in the first content of the display portion currently displayed;

an undisplay portion specifying step of specifying an undisplay portion of the content information which is assumed not yet to be displayed on the display, from the display position information;

a condensed information generating step of generating condensed information obtained by condensing, based on the feature element, content information of a third content, which is determined as being included in the undisplay portion based on position information of the third content and the display position information acquired in the display position information acquiring step;

a condensed information displaying step of causing the display to display the condensed information;

an input decision information acquiring step of acquiring input decision information when no input is received for a given period and an input is received again, based on input information, wherein the condensed information is automatically displayed on the display when acquiring the input decision information.

5. An information providing apparatus comprising:

at least one memory operable to store program code;

at least one processor operable to read the program code and operate as instructed by the program code, the program code including:

display position information acquiring code configured to cause the at least one processor to acquire, from a terminal, display position information for specifying a display portion of the content information displayed on a display of the terminal among content information to be displayed on the display;

operation position information acquiring code configured to cause the at least one processor to receive, from the terminal, operation position information for specifying a position at which an operation is operated, by a user, on a first content of the display portion currently displayed on a screen;

gaze portion specifying code configured to cause the at least one processor to specify a gaze portion gazed by the user in the first content of the display portion currently displayed, based on the position specified by the operation position information;

feature element extracting code configured to cause the at least one processor to extract a feature element of a second content in the gaze portion from the gaze portion, the second content in the gaze portion being included in the first content of the display portion currently displayed;

undisplay portion specifying code configured to cause the at least one processor to specify an undisplay portion of the content information which is assumed not yet to be displayed on the display, from the display position information;

condensed information generating code configured to cause the at least one processor to generate condensed information obtained by condensing, based on the feature element, content information of a third content, which is determined as being included in the undisplay portion based on position information of the third content and the display position information acquired by the display position information acquiring code;

condensed information transmitting code configured to cause the at least one processor to transmit the condensed information to the terminal;

input code configured to cause the at least one processor to receive an input and acquire input information; and input decision information acquiring code configured to cause the at least one processor to acquire input decision information indicating that no input is received for a given period and an input is received again, based on the input information acquired by the input code, wherein the condensed information display code causes the at least one processor to automatically display the condensed information on the display when acquiring the input decision information indicating that no input is received for a given period and an input is received again.

* * * * *